US007945614B2

(12) United States Patent
Ebata et al.

(10) Patent No.: US 7,945,614 B2
(45) Date of Patent: May 17, 2011

(54) SPACE-TIME COMMUNICATION SYSTEM

(75) Inventors: Tomoichi Ebata, Kawasaki (JP); Hiroshi Saito, Kawasaki (JP); Takeshi Ishizaki, Kawasaki (JP); Junji Fukuzawa, Kawasaki (JP); Minoru Koizumi, Kawasaki (JP); Toshiichiro Sasaki, Kawasaki (JP); Yoshiaki Adachi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 826 days.

(21) Appl. No.: 10/557,938

(22) PCT Filed: May 20, 2004

(86) PCT No.: PCT/JP2004/006835
§ 371 (c)(1),
(2), (4) Date: Feb. 28, 2007

(87) PCT Pub. No.: WO2004/114712
PCT Pub. Date: Dec. 29, 2004

(65) Prior Publication Data
US 2008/0098068 A1    Apr. 24, 2008

(30) Foreign Application Priority Data

May 21, 2003   (JP) ................................ 2003-142837
May 7, 2004    (JP) ................................ 2004-138008

(51) Int. Cl.
*G06F 15/16* (2006.01)

(52) U.S. Cl. ........................................ 709/203; 709/206
(58) Field of Classification Search .................. 709/206, 709/203
See application file for complete search history.

(56) References Cited

U.S. PATENT DOCUMENTS

| 6,677,858 B1* | 1/2004 | Faris et al. ................. 340/573.1 |
| 6,801,850 B1* | 10/2004 | Wolfson ........................ 701/209 |
| 7,171,389 B2* | 1/2007 | Harrison ........................ 705/51 |

FOREIGN PATENT DOCUMENTS

| JP | 6-334595 | 12/1994 |
| JP | 2000-004484 | 1/2000 |
| JP | 2000-324246 | 11/2000 |
| JP | 2002-123589 | 4/2002 |
| WO | WO 03/014670 A1 | 2/2003 |

* cited by examiner

*Primary Examiner* — Kyung-Hye Shin
(74) *Attorney, Agent, or Firm* — Antonelli, Terry, Stout & Kraus, LLP.

(57) ABSTRACT

A technique for performing message communications while assigning a space and respective time periods or time points at present, in past and in future is disclosed. A space-time object intercepts a message. Alternatively, this object per se executes the processing for immediately transmitting a message to a target object under management with relevancy thereto, for retaining the message by a future time point assigned, or for preparing and sending a message for searching logs in the past, thereby to realize the space-time communications.

10 Claims, 16 Drawing Sheets

SPACE-TIME COMMUNICATION SYSTEM

TECHNICAL FIELD

The present invention relates to a method or a system for performing message communication between target subjects which exist within a geometric space at present, existed in past and will exist in future. This patent application claims priority to Japanese Patent Application No. 2003-142837, filed May 21, 2003, the contents of which are incorporated herein by reference in terms of the designated country as indicated hereby.

BACKGROUND ART

There is a geographic information system (GIS) as a technique for enabling advanced analysis and expeditious judgment through comprehensive management and processing of geographical space data (land map data) having information as to positions and spaces while offering visual displayability thereof.

GIS is adaptable for use as systems including, but not limited to, area marketing, global disaster-prevention information systems, and scenery simulation systems, by letting several kinds of data be linked to map data, wherein examples of the former are vegetation data, weather data, land coverage data, disaster prevention data, regional development data, demographic data, agricultural statistics data, land use data, road/river ledger data and others.

Regarding a method for managing target subjects within a geographical space, this is disclosed, for example, in Patent Document 1. The invention as taught thereby is such that when inputting conditions of a user-desired fixed property to a user terminal device, access is provided via the Internet to a landed estate information database and a geographic information database, for causing search results such as a distribution of per-area fixed properties to be displayed on a land map and for permitting, upon selection of a desired area, landed estates to be displayed on such area's land map in the form of marks. Furthermore, when selecting a single landed estate on the map, its detailed information is displayed along with a surrounding area map thereof. Upon discovery of a preferred landed estate, the user operates the user terminal device to give access to a real estate broker terminal device for establishment of a provisional contract. The invention is aimed at provision of an information providing method, apparatus and system capable of readily searching any desired real estate in landed estate search-up events.

Further, as for communications while taking account of the position of a target person, a technique therefor is disclosed in JP-A-2000-004484. The invention is such that a message sender sends his or her message to unspecified users who match conditions, by merely specifying the conditions as to a space without specifying message recipients. The invention permits the message sender to merely specify conditions as to the space (or space and time) without specifying message recipients to thereby send a message to unspecified users matching the conditions whereby a user who is walking on a street can receive messages being best suited to such location (or the location and its time) so that spatially (or spatially and timely) optimized user-to-user communications are establishable.

DISCLOSURE OF INVENTION

However, the contents as disclosed in JP-A-2002-123589 and JP-A-2000-004484 fail to provide sufficient teachings concerning message communications between target subjects existing within a geographical space—more specifically, these are faced with problems as to deficiency in dynamic information handleability, limited manageability to one subject per event, and necessity of specifying a message destination party.

Moreover, with the contents disclosed in JP-A-2000-004484, a need is felt to perform the tracking of a subject under management in the location (or, location and time); however, performing tracking of a plurality of management targets on a real-time basis can give overload to the system in some cases. When an attempt is made to increase the length of an information collection time interval for such tracking in order to avoid this risk, it will possibly happen that detectability is lost even in a case where the management target belongs to the location of interest.

The present invention as disclosed and claimed herein relates to the GIS for handling real subjects correlated with displayed objects (for example, ion objects) within a geographical space (e.g., land map data or else), and makes it possible to establish not only static information of the subject (e.g., real estate's neighborhood land map, real estate's room layout, etc.) but also a communication path between the object and the subject to be required when wanting to know actual real-time situations of a landed estate (e.g., live video image of real estate nearby area, comings and goings of people, ambient noises, disaster situations, etc.) or alternatively enables interexchange of message data and/or stream data from sensors or cameras by use of the communication path established.

The present invention also provides a method for permitting users to totally know not only the status of only one assigned subject but also the state of a subject in a specified space in a geographical space (e.g., on a land map) to thereby exhaustively understand a status of the space of interest.

In addition, this invention provides a method for using objects on land map data to make communications with a coping member and/or a customer who is moving at every instant. Whereby, it becomes possible to allocate on the map data certain objects as linked to real-time position information, such as coping members or customers or like persons, which in turn enables utilization of GIS for maintenance and security services.

This invention further provides an all-at-once communication method for sending messages in unison to a specific space. Thus it becomes possible, in case a disaster occurs near the land area in which a coping member and a customer or client stay, to send caution messages in unison to the coping member and customer who are in nearby areas of such disaster district and also to issue an instruction to sensors and/or cameras being disposed at or near the disaster district, for forcing them to send detailed information.

This invention also provides a space assigning method utilizing land map data. Whereby, it becomes possible to assign using the land map data the above-noted specific space and then send a message(s).

This invention also provides a method of sending a message to more than one sensor and/or one or more cameras. Whereby, it becomes possible to transmit a message to cameras and/or sensors while designating a time point in future, thereby enabling transmission of sensor information and/or video information at regular time intervals, for example.

This invention also enables implementation of the above-noted communication at a specifically designated time point in the past. Whereby, it becomes possible to send a message to cameras and/or sensors while designating the past time point, thereby making it possible to acquire at a present time point the data for clarification of the cause of a disaster occurred in the past. In greater detail, in order to examine the cause of a fire that was occurred last night, it is possible to display the behavior of every temperature sensor or monitor camera which is allocated at a fire-occurred building or a coping member who exerted himself for handling in a time-series direction within a time period of from a time point of three-hour before the occurrence of the fire to an instant one-hour after the fire occurrence.

In addition, this invention makes it possible to recurrently deliver an attention-calling message(s) in a specified space at a specified time within a predefined time period or within a time zone. Whereby, it becomes possible to enhance the level of nighttime surveillance in danger areas suffering from frequent occurrence of disasters and crimes, for example.

This invention also makes it possible to notify a target subject under management or a communication device as owned thereby of the information as to any one of the above-noted past, present and future time or the space. Thus it becomes possible for the subject under management or its own communication device to independently judge on a real-time basis whether the subject under management belongs to the above-described past or present or future time or the space, which in turn enables avoidance of system overload otherwise occurring due to real-time tracking even in cases where the management target increases in number.

This invention also enables restriction of an information-notified target subject under management in the case of notifying a subject under management or its own communication device of the information as to the past or present or future time or the space. Thus it is possible to timely and spatially control whether it is necessary or not to forward information on a per-subject basis while taking into consideration the possibility of belonging to the past, present or future time or the space, thereby enabling reduction of communication loads and costs.

In accordance with one aspect of this invention, a space-time communication method or a space-time communication system includes in a memory space of this system a means for generating an object which is in a one-to-one correspondence relationship with each subject to be managed (this object generated will be referred to hereinafter as an object under management), means for generating a communication path between the generated object under management and a subject being managed, means for notifying in the generated communication path the object under management of a status situation of the subject under management, means for performing response to an event as given to the object under management or for notifying this subject under management of the contents of such event, means for reserving a storage region used to store therein the contents of each kind of event occurred at the object under management and for storing in this storage region the contents of such events, means for displaying a position whereat the subject under management exists on land map data of this system, means for assigning a space as assigned on this map data along with a present or past or future time or a time point and a message to thereby generate an object(s) in the memory space of this system (this generated object will be referred to as a space-time object hereinafter), means for generating a communication path between the generated space-time object and the object under management, means for causing the space-time object to conduct a search for the object under management with which this object communicates, and means for performing message communication between the generated space-time object and the object under management.

Other objects, features and advantages of the invention will be apparent from the following description of currently preferred embodiments of the invention, as illustrated in the accompanying drawings.

BEST MODE FOR CARRYING OUT THE INVENTION

Embodiments of the present invention will be described below.

Embodiment 1

In this embodiment, there will be explained a surveillance service using various types of sensors and cameras as allocated at houses, offices, driving schools, convenience stores, amusement facilities, public transport facilities, and other personal assets or fixed estates of contract customers or clients subscribed to this service (hereinafter, simply called the "customers") or alternatively using customers' mobile cellular phones and PHS phones or like tools having a GPS receiver module, a temperature/humidity sensor or a blood-pressure/pulsation sensor to detect a customer' accident such as fire, robbery and others at a personal estate or landed estate thereof and dispatch thereto a coping member for handling the above-noted fire or theft or for rescuing the customer(s).

A surveillance system in accordance with this embodiment will be set forth by using FIG. 1, which system uses a plurality of cameras, sensors, coping member terminals, customer terminals and central management console equipment. Cameras 40 are connected to a network 10-2 through a camera control device 30 while sensors 60 are connected thereto via a sensor control device 50. A surveillance console control device 20 which is manually operated by a headquarter officer 12 is equipped with a monitor 14, a mouse 24 and a keyboard 22 and is linkable to a network 10-1. The headquarter officer or "commander" 12 uses this surveillance console control device 20 to perform execution of this system. A plurality of console control devices are installable, each being similar to the device 20. Message communication devices 70-1, 70-2 are linked to a wireless radio-transmission network 10-3, with each message communication device indicating possession of a plurality of persons including a coping member or serviceman 1-1 and a customer 1-2 who are owners of such devices. Additionally, the target subjects being managed of the message communication devices 70 may be not only natural persons but also other physical entities.

Note that the networks 10-1, 10-2, 10-3 are connected together by gateways 10-12, 10-13, wherein the above-noted networks may be any types of ones regardless of whether these are wired, wireless or other networks. During operation of the surveillance system, video images from the cameras 40 are sent via the networks 10 and displayed on the monitor 14 based on an instruction(s) from the console control device 20. Upon detection of abnormal events such as a fire or illegal invasion or else, the sensors notifies the headquarter officer 12 of alarm information thereof via the console control device 20.

FIG. 2 is a diagram showing a hardware configuration of the surveillance console control device 20, wherein an input/output controller 106 for control of a network interface card 112, CPU 102, memory 104, keyboard 22 and mouse 24, a hard disk controller 107 for connection with a hard disk 105, and a monitor controller 108 are connected by an internal communication link 110 such as a bus (referred to as the bus hereinafter).

FIG. 3 is a diagram showing a hardware configuration of the camera control device 30, wherein a camera controller 136 for control of cameras 40, a CPU 132, a memory 134, a network interface card 130, and a hard disk controller 137 for connection to a hard disk 135 are connected by a bus 138.

FIG. 4 is a diagram showing a hardware configuration of the sensor control device 50, wherein a sensor controller 146 which is connected to the sensors 60 for doing setup of these sensors and for reading an abnormality detection signal(s) from a sensor(s), a CPU 142, a memory 144, a network interface card 140, and a hard disk controller 147 for connection with a hard disk 145 are connected by a bus 148.

A hardware configuration of message communication device 70 is shown in FIG. 5. The message communication device 70 has a hardware configuration including a network connection controller 704, a CPU 720, a memory 722, a key-input controller 706 for control of a data entry interface 708 which is a keyboard in the case of a personal computer (PC) or a numeric pad in the case of a mobile phone or PDA or else, an audio input/output controller 710 for controlling a microphone 714 and speaker 712, a monitor controller 716 for control of a monitor 718 of PC, mobile phone or PDA, a GPS receiver module 724 for acquiring position data from GPS receiver 726, a temperature/humidity sensor module 728 for obtaining temperature/humidity data from a temperature/humidity sensor 730, a blood-pressure/pulsation sensor module 732 for getting blood-pressure/pulse data from a blood-pressure/pulsation sensor 734, a hard disk controller 737 for connection with a hard disk 736, and a camera controller 738 for connection to a camera 740, which are connected together by a bus 702.

Note here that although this embodiment is explained while using the above-noted ones as its sensor and sensor module equipped in or connectable by the message communication device 70, such limitation is actually not necessary, and any one of a light sensor, infrared light sensor, thermocouple, gas sensor, magnetometric sensor, ultrasonic sensor, vibration/acceleration sensor, current sensor, pressure sensor, distortion sensor, wind velocity sensor and other sensors along with various types of modules for acquisition of data thereof may be equipped in a main body of the message communication device 70 or alternatively externally connected thereto.

FIG. 6 is a diagram showing a software configuration of a software program as stored in the memory 104 of the surveillance console control device 20. Stored therein are a network interface card control driver 174 for control of the network interface card 112, a communication manager module 172 for performing communications between it and a device that is designated via the network 10-1, 10-2 or 10-3, and an input/output device control driver 150 for control of input/output of data as sent to and received from a transmission cue 166, receipt cue 170, monitor 14, keyboard 22, mouse 24 or hard disk 105.

Also stored are a GIS module 182 which performs reading and writing of GIS data to be sent to and received from the hard disk 105 or memory 104 storing therein map data or other kinds of information and then displays such data at the monitor 14 via the input/output device control driver 150, a remote log-in server module 181 which provides the remote message communication device 70 with an interface for the above-noted display or operation, a video/alarm control module 176 for controlling video or alarm information to be sent from the camera control device 30, sensor control device 50 or message communication device 70, a tracking module 178 for control of tracking information as sent from the camera control device 30, sensor control device 50 or message communication device 70, a space-time communication control module 180 for controlling space-time communications, and an object management module 184 for preparing in the memory 104 objects which are correlated with target subjects under management in this system and for performing operation or disappearance of the objects.

Note that the "object" as recited in each embodiment are the ones that realize processes attainable in such a way that CPU executes a program corresponding to each of the physical subjects existing in the real world (such as serviceman terminal, camera, sensor or else), such as certain functions required to the subject of interest, including but not limited to a function for communication with other objects.

For example, when wanting to send a message to a certain coping member or serviceman, an object-to-object communication function is used to perform message transmission to such serviceman object, it becomes possible to send the message to the serviceman.

FIG. 7 is a diagram showing a software configuration to be installed in the memory 134 of the camera control device 30, which is a zone management target node of this embodiment, in which stored are a network interface card control driver 201, a communication manager module 202, a camera control driver 218 for control of a camera(s) 40, and an input/output device control driver 219 for controlling the hard disk 135. Also stored is a camera control module 216 as a module which utilizes these software programs, each being operatively associated with the communication manager module 202 via a receive cue 204 and a send cue 206.

FIG. 8 is a diagram showing a software configuration as installed in the memory 144 of the sensor control device 50, in which stored are a network interface card control driver 220, a communication manager module 222, a sensor control driver 238 for control of a sensor(s) 60, and an input/output device control driver 232-2 for controlling the hard disk 145. Also stored are a sensor control module 236 and an alarm send module 231 as modules which utilize these software units, each being operatively linkable with the communication manager module 222 via a receive cue 224 and send cue 226.

A software arrangement of the message communication device 70 is shown in FIG. 9.

The software configuration of the message communication device 70 is made up of a set of network control driver 772 and a communication manager module 770 for sending and receiving a message to and from the network 10-3, a pair of send cue 766 and receive cue 768 for temporal storage of an incoming or outgoing message, an input/output device control driver 750 for performing data exchange with the monitor or keyboard or else in the message communication device 70, a sensor control processing module 752, an audio control processing module 754, an image control processing module 756, a key-input processing module 758, a monitor control processing module 760, and a remote log-in module 762 which is operatively associated with the remote log-in server module 181 of the console control device 20 for providing an interface and on-screen images to be displayed on the monitor of this console control device 20.

Each of the above-noted software modules is executed by CPU in each device to thereby realize a prespecified function. Additionally each software may be prestored in the memory of each device or alternatively introduced, when necessary, into the memory by way of a data storage medium or communication media utilizable by the device (i.e., via a communication line or any one of a carrier wave and digital signal on the communication line).

See FIG. 10, which shows a land map 141 on a map viewer 143 to be displayed on the monitor 14 of the console control device 20. The land map 141 is displayable in reply to an instruction from the headquarter officer 12, which identifies a display region thereof and is also displayable with a specific land spot being as the center, which spot is judged so that an incident such as a fire or theft occurred thereat based on the alarm information obtained from the camera control device 30 or the sensor control device 40. Displayed on the map 141 are an article icon object 141-1, camera icon object 141-2, sensor icon object 141-3, serviceman icon object 141-4, and customer/client icon object 141-5.

These icon objects which are disposed on the land map 141 indicate the positions of real subjects (articles, cameras, sensors, serviceman and customer) corresponding to respective icon objects at the time the map 141 is displayed—for example, if the serviceman or customer moves, its corresponding icon object also moves on the map. Further, by specifying each icon object on the map 141 by use of a pointing device such as the mouse 24 of FIG. 2, it is possible to perform operations for such real subject.

Using FIG. 11, an explanation will be given of the contents of processing to be performed on the land map 141 in a case which follows: when a camera, sensor, customer or serviceman issues to this surveillance system a request for entry or exit, the processing is done relating to the entry or exit between the surveillance console control device 20 and a respective one of the camera control device 30, sensor control device 40 and message communication device 70. When the serviceman turns on the power of his or her own message communication device 70-1 or alternatively performs an operation for system entry through the interface of such message communication device 70-1, this device sends forth a message toward the monitor console control device 20 via the network 10-3, gateway 10-13 and network 10-1 of FIG. 1, which message contains therein the serviceman's position data, his or her ID number, system entry request and other necessary information items. A typical example of the format usable for these position information items is NMEA-0183 (recited in detail in "NMEA 0183 Interface Standards" published by National Marine Electronics Association) or equivalents thereto.

Upon receipt of the message, the monitor console device 20 causes the map viewer 143 on the monitor 14 to perform blinking display of the serviceman icon object 141-1 while displaying an entry admission viewer 160. The headquarter officer 12 pushes down any one of "OK" and "NO" buttons to return to the message communication device 70-1 a message which involves therein the content of either system entry grant or rejection, thereby enabling grant or rejection of the serviceman's system entry. It is also possible for the head officer 12 to know about the serviceman who wants to join the system by pressing a "Detail" button for displaying a status viewer 151. It is also possible for head officer 12 to make contact with the serviceman by pushing down a "COM" button to display a message viewer 153.

Alternatively, in case the serviceman wants to exit from this system, the serviceman turns off power of his or her own message communication device 70-1 or performs an operation of system exit via the interface of such message communication device 70-1 whereby a message which contains the handler's position data, his or her ID number, system exit request and other necessary information items is sent from the message communication device 70-1 toward the monitor console control device 20 through the network 10-3, gateway 10-13 and network 10-1 of FIG. 1

Upon receipt of this message, the monitor console device 20 causes the map viewer 143 on monitor 14 to perform blinking display of the serviceman icon object 141-1 while displaying an exit admission viewer. This viewer is displayed with an indication "Serviceman's Exit Requested" as a message of the entry admission viewer 160. The headquarter officer 12 pushes down the "OK" or "NO" button to send back to the message communication device 70-1 a message which involves therein the content of either system exit allowance or rejection, thereby enabling grant or rejection of the serviceman's system exit. It is also possible for head officer 12 to know about the serviceman who wants to join the system by pressing the "Detail" button for displaying the status viewer 151. It is also possible for head officer 12 to contact the serviceman by pushing down the "COM" button to display the message viewer 153.

A procedure concerning the entry to or exit from this system to be done by the camera control device 30 and sensor control device 50 plus customer message communication device 70-2, which are the target subjects in this system and the server for managing the subjects, is performed in the same procedure relating to the above-noted serviceman's entry to or exit from this system. In this case, with regard to a respective one of the serviceman message communication device 70-1, customer message communication device 70-2, camera control device 30 and sensor control device 50 which are not authorized to join this system, it is permissible to perform entry authorization checking by registering in advance such subjects with entry authorization in the object management module 184 of monitor console control device 20.

Using FIG. 17, an explanation will be given of a procedure for causing an object of the serviceman to be generated by the object manager module 184 in the memory 104 of the monitor console control device 20.

The object manager module 184 generates a serviceman object 1141-4 in the memory 104 in response to power-on of the message communication device 70-1 owned by the serviceman 1-1 or execution of a system entry operation via the interface of the message communication device 70-1. This serviceman object 1141-4 thus generated assigns part of a storage region 1051 of the hard disk 105 as the storage region owned by this object. This storage region 1051 is also usable as part of the hard disk 736 owned by the main body of message communication device 70.

Next, the serviceman object 1141-4 permits execution of processing for converting the serviceman position data as sent from the message communication device 70-1 into the coordinates of a display position on the land map and for displaying a serviceman icon object 141-4 while letting it blink when the need arises.

In addition, the position of the message communication device 70-1 is transferred to the serviceman object 1141-4 via a communication path as will be described later at regular time intervals. The serviceman object 1141-4 changes the coordinates of the display position on the map when necessary or at appropriate time intervals whereby the serviceman icon object 1141-4 is seen to move on the land map 141. The conversion of the map display position coordinates is such that acquisition is done by inquiry to a map object 1410 while having the coordinates on the map. This map object is generated during displaying of the land map 141 and will disappear at the time the map is erased.

Furthermore, the serviceman object 1411-4 uses the serviceman's ID number as sent from the message communication device 70-1 to acquire the serviceman's profile information from a serviceman profile database (DB) 1052 where necessary, followed by displaying of the status viewer 151 of FIG. 11 if necessary. Those for the customer use include a customer profile DB 1053, whereas that for the camera or sensor use is a surveillance device profile DB 1054.

Further, the serviceman object 1411-4 prepares a communication path between it and the message communication device 70-1. There are no special limitations concerning this communication path's protocols and connection types or anti-connection types, etc. A procedure for disappearance of the serviceman object 1411-4 in the memory 104 of the monitor console control device 20 includes the steps of receiving a system exit request message from the message communication device 70-1, experiencing the head officer 12's processing stated previously, and thereafter letting the serviceman object 1411-4 disappear while preventing free access of the storage region 1051 because this is to be used during past-time space search processing as will be later described. An object-oriented target subject management method with the supportability to the above-noted serviceman is similar in principle to the management methods of the cameras, sensors and customers or clients. Additionally each object-use storage region 1051 stores or "records" therein a variety of kinds of events (alarm, message, image, video, etc.) concerning objects along with time points at which such objects occur.

FIG. 12 shows a way for operating windows and viewers to be displayed on the monitor 14 of console control device 20 or the above-noted icon objects to thereby execute information acquisition and instruction or else with respect to a real subject(s). When the headquarter officer 12 selects a camera icon object 141-2 by the mouse 24 or else, a menu screen 146-2 concerning this camera icon object 141-2 is displayed; upon selection of "Status" which is one of such menu items, a status viewer 147-2 is displayed.

In this status viewer 147-2, there are displayed a title/name, model name, installation location address, setup article name and a live video being captured by the camera of interest. When choosing "Properties" which is another one of the menu items of the menu screen 146-2, a property viewer 148-2 is displayed with a list of conditions for causing a camera control device for management of this camera to generate an alarm, which conditions are modifiable by an operation of the head officer 12—here, options of the alarming conditions are "When Moving Thing Detected" and "Only Night," any one of which is selectable.

Those information items other than the live video may be stored in the storage region 1051 used for respective objects on the hard disk 105 of console control device 20 or in the memory 104, or alternatively stored on the hard disk 135 of camera control device 30 or in the memory 144. The same goes with the sensor control device 50 and message communication device 70.

When the headquarter officer 12 selects the serviceman object 1411-4 by the mouse 24 or else, a menu screen 149 relating to this serviceman object 1411-4 is displayed; upon selection of "Properties" which is one of such menu items, a property viewer 151-2 is displayed. Displayed in this property viewer 151-2 are the serviceman's name, birth date, carrier, section in charge, and facial portrait. When choosing "Status" which is another menu item of the menu screen 149, numeric values indicative of this serviceman's present position, azimuth, velocity and speed deviation are displayed, thereby making it possible to show the head officer 12 a present status or situation of the serviceman 141-4.

When selecting "Message" which is still another menu item of the above-noted menu screen 149, a message viewer 153 is displayed, thereby enabling transmission of a message with an attached file(s) toward the serviceman.

Pushing a call-out button 153-1 of the message viewer results in a phone call being made automatically to the serviceman 141-4, thereby enabling the head officer 12 to have a conversation via the speaker 26 with the serviceman.

Upon receipt of a phone call from the serviceman 141-4, the serviceman icon object 141-4 corresponding to the serviceman who made a call begins blinking, resulting in appearance of a message notice viewer 154. In case the head officer 12 has a talk with the serviceman, he or she pushes "Receive (or Call)" button and thus can have a conversation with the serviceman via the microphone 25 and speaker 26 provided at the monitor console 20.

Alternatively, when selecting "Ignore" button, such reception or call-acceptance is not performed at the console 20.

It is also possible for the head officer 12 to designate a plurality of servicemen (155) and then transmit a message to every member or make a telephone call thereto. In the case of the telephone, perform a group telephone call with more than three members.

A sensor alarm viewer 142-2 is responsive to receipt of alarm information from the camera control device 30 or sensor control device 40, for adding a unique case number to such event and for displaying a brief summary of the event while displaying a map viewer 143 which contains therein a land map 141 of an area near or around a land spot whereat the event occurred.

This land map 141 is expandable or shrinkable in size by a zoom button 143-1 or shrink button 143-2 as laid out in the map viewer. An article icon object 141-1 blinks on the map 141 to thereby enable the head officer 12 to ascertain that an accident warning alarm was generated from the article. When selecting the article icon object 141-1 by the mouse 24 or else, a menu screen 144-2 concerning this article icon object 141-1 is displayed; upon selection of a "Properties" which is one of such menu items, a property viewer 145 is displayed. Displayed in this property viewer 145 are a customer/client name, customer/client number, contract service contents and section in charge along with a photograph of such article.

When choosing "Room Layout" which is another one of the menu items of the menu screen 144-2, a floor layout diagram 150-2 of such article is displayed. This floor layout diagram 150-2 is displayable in an expanded or shrunk manner by manual operation of a zoom or shrink button. In case this floor layout diagram involves a camera icon object or a sensor icon object, selecting the camera icon object makes it possible to perform a similar operation to that when the camera icon object 141-2 is selected by the mouse 24.

It is possible for the head officer 12 to perform position input and scale assignment by a status-based subject search viewer 156 and then display a land map 141 at this position assigned. Further, instructing a subject(s) such as a serviceman and/or sensor type or else makes it possible to blink an icon object(s) pertinent to the subject(s). It is also possible, by instructing a statement that is defined as the status such as "Serviceman who does not arrive at the site and who is in halt condition for more than two minutes," to discover in the land map 141 a serviceman who is deemed to be out of the normal state (i.e., the state he does not yet arrive thereat and is encountered with an accident and so cannot move).

Further, it is possible for the head officer 12 to use the mouse 23 to appoint any given space of the land map 141 being displayed on the map viewer 143 and define it as a space-time object. This space-time object will be described later.

Additionally, letting the remote log-in module 762 of FIG. 9 and the remote server module 181 of FIG. 6 work together enables acquisition of an on-screen image which is similar to that of the monitor 14 of the console terminal 20 of FIG. 11 even on a display screen of the message communication device 70 being hand-carried by the serviceman 1-1 or customer 1-2, which in turn makes it possible to perform operations of the various kinds of viewers and space-time objects in accordance with the authorization of the serviceman 1-1.

FIG. 13 is a diagram showing a method for assigning any given space of the land map 141 to be displayed on the map viewer 143 and for performing instruction to any subject under surveillance which belongs to this space. The head officer 12 uses the mouse 23 or else to appoint a given space of the land map 141 to thereby generating a space object 200. Furthermore, by operating the space object 200 by the mouse or else, a menu screen 202 is displayed concerning this space object 200. When selecting "Status" which is one of such menu items, a status viewer 204-2 is displayed, resulting in visual display of the information of target subjects under management in this system, which exist in the space as appointed by the space object 200. Although in this embodiment a subject number is merely displayed, detailed status of each subject under management such as shown by 152 of FIG. 12 may be displayed in this status viewer 204-2.

When selecting "Communication Now" which is one of the menu items of the menu screen, a message send screen 206 is displayed. When choosing from a subject menu of this message send screen 206 a subject under management which exists in the space as designated by the space object 200, a message box 2064 appears which is used for transmission of a message to such under-management subject. In this message box, a message that is understandable by this subject is written.

Here, a temperature sensor is selected and a sentence "Set Alarm 40 deg. C" followed by pushing down a send button 2066, whereby the message "Set Alarm 40 deg. C. (Activate alarm when the temperature reaches 40 degrees)" is sent to the sensor control device 40 for management of more than zero temperature sensor existing in the space as assigned by the space object 200 (also including the case where no temperature sensors are present in the space object). This message is received by the sensor control module 236 of sensor control device 40 and then stored in the memory 144 or the hard disk 145 of FIG. 4. And, this sensor control device 40 begins the monitoring of a temperature of the temperature sensor under self management and generates an alarm when reaching the situation of the message.

The message send screen 208 is for selecting "Serviceman" as a subject under management and for indicating a way for transmission of a message 2082 "Arson repetition area. Careful check is required." This message also is sent to the message communication device 70-1 in a similar form to that stated previously and is displayed on a monitor of this device in a similar way thereto. Additionally, the "No restrictions" of the subject menu of the message send screen 206 is the one that sends such message to every subject under management existing in the space designated by the space object 200, the interpretation of which message is uniquely performed on the under-management subject side. An exemplary usage of this "No Restrictions" menu will be described later.

Another exemplary space object generation method is shown in FIG. 18. This method is such that after the head officer 12 has appointed a given point on the land map 141, he performs an operation by the mouse 24 or else whereby the GIS manager module 182 outputs a space object generation assisting screen. When the head officer 12 inputs "Serviceman" as a subject of interest and "8 minutes" as a delay time, a space with the possibility that a serviceman can arrive at a position instructed by the mouse 24 within 8 minutes is automatically generated as a space object 201.

FIG. 14 is a diagram showing a method for assigning a given space of the land map 141 to be displayed on the map viewer 143 to thereby perform instruction for a subject under management which belongs to this space while displaying a response to such instruction.

The sensor alarm viewer 142-2 shown in FIG. 12 is responsive to receipt of alarm information from the camera control device 30 or sensor control device 40, for adding a case number to such article and then displaying a brief summary thereof while simultaneously displaying a map viewer 143 involving a land map 141 of a nearby region of the site whereat an accident occurred. The head officer 12 ascertains occurrence of the kind of abnormality at the sensor that is associated with a sensor icon object 141-3, which is blinking while being displayed on the land map 141 on the map viewer 143. Next, the head officer 12 prepares a space object 201 as a surrounding area of the sensor that has reported this abnormality.

Further, by operating the space object 210 by the mouse or else, a menu screen relating to the space object 210 is displayed. When selecting "Communication Now" which is one of such menu items, a property screen 220-2 is displayed. Then, select "No restrictions" from a subject menu 2202 of this property screen 220-2; next, push down a send button 2206, thereby to send a message with its content of "Report a present situation" toward every under-management subject existing in the space as appointed by the space object 210.

After having sent this message, the present situations as sent from respective under-management subjects are displayed on the monitor 14 of the monitor console control device 20 in respective status viewers. A temperature that was measured by a temperature sensor and its related other data are displayed in a temperature sensor status viewer 210-1, 210-2; a camera-captured video image and information related thereto are displayed in a camera status viewer 210-3. A respective serviceman, customer or client's position, azimuth, moving velocity and others are displayed in a serviceman status viewer 210-4 and customer/client status viewer 210-5, respectively. In case multiple under-management subjects exist within the space object 210, when the correspondence relation thereof is confusable, it is possible to display corresponding bars 210-6 to 210-10 in order to provide visual correlation between the under-management subjects and their status viewers. When the head officer 12 moves a status viewer of certain under-management subject, its corresponding bar is also moves while relating the correspondence relation thereof.

Using FIG. 17, an explanation will be given of a method for sending a message to an arbitrary space which was stated in conjunction with FIG. 13. When pushing down the send button 2066 of the message send screen 206, the object manager module 184 generates an immediate communication object 1200. The immediate communication object thus generated searches the object of a temperature sensor which is the subject of the immediate communication object 1200 from among camera objects 1141-2, sensor objects 1141-3, serviceman objects 1141-4 and customer/client objects which are under-management subjects, and finds a temperature sensor object belonging to the space designated by the space object 200 from the temperature sensor object while cooperating with the map object 1410, and thereafter sends the message of the message box 2064. The sensor object which has received this message operates based on its unique object judgment, including transmission of a message to the sensor control device 50.

Note that the immediate communication object 1200 disappears after having completed transmission of this message. Regarding the statement defined as the status such as the above-noted "Serviceman who does not arrive at site and who is in halt condition for more than two minutes," it is also possible by a method similar to the above to generate an object, monitor this object for two minutes, find the above-noted "Serviceman who does not arrive at site and who is in halt condition for more than two minutes," send a message to a corresponding object, and then perform processing for letting such icon object blink. As for the transmission of the above-noted no-restriction message of FIG. 14 also, generate an immediate communication object and perform an operation by similar methods.

FIG. 15 is a diagram showing a future-time space object generation method. The head officer 12 prepares a space object 230 on the land map 141 being displayed on the map viewer 143. Then, operate the space object 230 by the mouse or the like, whereby a menu screen 232 concerning this space object 230 is displayed. When selecting "Space-Time Communication" which is one of such menu items, a menu screen 234 is further displayed. Upon selection of "Future-Time Space" which is one of the menu items, another menu screen 236-2 is displayed. When choosing "Time Assign" which is one of the menu items, a time-assigned message send screen 238-2 is displayed.

The head officer 12 uses the time-assigned message send screen 238-2 to make settings for sending a message "Fire occurs near train station. Leave there." toward the space designated by the space object 230 when a customer first enters such area within a time period of from a present time to two-hour later, and name it as "space-time B," and then push a start button whereby the above-noted function gets started so that a status bar 240 under the name of "space-time B" is registered on the map viewer 143 as one of the space-time objects, resulting in the visual display of the space object 230 becoming temporarily invisible on the land map 141.

In this way, the time-assigned message send screen 238-2 is capable of throwing a message to the space at the assigned time by checking "Only Once" menu of the same screen to thereby designate a start time in future and its continuation time period and is also capable of sending the message repeatedly by selection of "Repeat" menu.

In this embodiment, the start time is set to "4/30 21:00," the continuation period is set to "45 minutes," and a repeat time interval is set to "7 days." With these settings, it becomes possible to permit this space-time communication to be in an activated state from 9 p.m. for 45 minutes, once per week.

In this system, there is provided an interpreter which understands the year, month, day, time, minute, second and other time-unit indications and which is designed to offer an ability to automatically interpret adequate time notations.

It is possible for the head officer 12 to display again the display of the space of such space-time object in the form of the same space as the space object 230, by operating using the mouse 24 or else the status bar 240 under the same name of "space-time B." By displaying on a menu screen 242 the contents of this space-time object and then selecting "Change" which is one of such menu items, it is possible to display it again as the time-assigned message send screen 238-2. It is also possible to modify the contents thereof.

Pushing down "Vanish" button results in the space-time object being disappeared and the "space-time B"-named status bar 240 being erased from the map viewer 143. Additionally, pushing "Duplicate" button results in the menu screen 234 being visualized, which permits preparation of a new future-time space object or a past-time space object by use of a space that is the same as the space assigned by the space object 230. The past-time space object will be described later.

For example, when selecting "Future-Time Space" which is one of menu items of the menu screen 234 and then selecting "Time Assign" that is one menu item of the menu screen 236-2, a time-assigned message send screen 244 is displayed. This time-assigned message send screen 244 and the message transmission in time-assigned message send screen 238 are the same as each other except for the lack of the concept of continuation time—in the time-assigned message transmission, a message is sent forth at a certain time point or when reaching a repeat time point. Note here that after the elapse of 2 hours since the generation of this object by the "space-time B" which is the above-noted space-time object, when reaching expiration at the end of its role, a warning message screen 244 is displayed.

When pushing down a button of "Continue with contents updated," the time-assigned message send screen 238-2 is displayed, which enables updating of the contents and then continuing this space-time object. When pushing down "Vanish" button, the space-time object disappears, resulting in the "space-time B"-named status bar 240 being erased from the map viewer 143. Additionally, the future-time space object is such that a plurality of ones are stored simultaneously. Operating a plurality of status bars 240 being registered to the map viewer 143 makes it possible to display the information of such space-time objects (spaces and their contents) at any given instant.

Even in the time-assigned message send screen 244 or the time-assigned message send screen 238, it is possible, by selecting "No Restrictions" from the object menu items and then writing "Get status" in a message box, to send a message with its content of "Report present situation" to every under-management subject existing in the space as designated by a space object at an assigned time point in future to thereby force it to return a situation report at such future time point. This would result in a similar display to that of FIG. 14 being done on the monitor 14 at the designated future time point.

Using FIG. 17, an explanation will be given of a method for realizing the future space-time communication that was stated previously with reference to FIG. 15. When pushing down the start button of the time-assigned message send screen 238, the object manager module 184 generates in its memory 104 a future space-time communication object 1230. The future space-time communication object 1230 generated goes into a standby state without performing any message transmission before a designated time.

When it becomes a start time point designated, activation gets started for searching a customer/client object that is a target of the future-time space object 1230 from among the objects under management, including the camera objects 1141-2, sensor objects 1141-3, serviceman object 1141-3 and customer objects. Then, after having found out from the customer objects the aimed customer object belong to the designated space of the space object 230 while working together with the map object 1410, send a message of the message box of the time-assigned message screen 238.

Further, the future space-time communication object 1230 checks at regular intervals whether any new customer/client object exists in the space designated by the space object 230 at the time assigned. If such is found then send thereto the message of the message box of the time-assigned message screen 238. On the other hand, when the start button of the time-assigned message send screen 244 is pushed down, the object manager module 184 generates in the memory 104 a future space-time communication object 1230-2. The future space-time communication object 1230-2 generated goes into a standby state and does not perform message transmission before the time assigned.

When it becomes a start time point designated, activation gets started for searching a customer/client object that is a target of the future space-time object 1230 from among the objects under management, including the camera objects 1141-2, sensor objects 1141-3, serviceman object 1141-3 and customer objects. Then, after having found out from the customer objects the aimed customer object belong to the designated space of the space object 230 while working together with the map object 1410, send a message of the message box of the time-assigned message screen 238.

When marking the expiration of such object, the future space-time communication object 1230 or 1230-2 displays a warning message screen 245. When "Vanish" is selected on the same screen or the menu screen 242, the future space-time communication object 1230 or 1230-2 disappears.

FIG. 16 is a diagram showing a past-time space object generation method. The head officer 12 prepares a space object 330 on the land map 141 being displayed on the map viewer 143. Furthermore, by operating the space object 330 by the mouse or else, a menu screen 332 concerning this space object 330 is displayed. When selecting "Space-Time Communication" which is one of option items of such menu, a menu screen 334 is further displayed. When choosing "Past-Time Space" which is one option of such menu, a menu screen 336 is further displayed. When choosing "Event Assign" which is one option of the menu, an event assign past-time space search screen 338 is displayed.

The head officer 12 uses the event-assign past-time space search screen 338 to instruct every under-management subject belonging to the space designated by the space object 330 to search for a specific time point whereat the measured temperature becomes 40 degrees or higher within a period of from a present time point to thirty days ago. Ex facto, such the instruction is only acceptable by the sensor control module 236 of a sensor control device 30 that is managing the temperature sensor, so those under-management subjects other than the temperature sensor are to ignore this instruction. Such ignorance is the same in the immediate space or future-time space also. Performing such instruction causes those registered past space-time subjects under management as will be described later to be displayed at all of the order-interpretable under-management subjects without limitation to the temperature sensor.

When the time point with the matched condition is found, registration is done while designating thereto a space-time name (here, "space-time D"). Thus, a status bar 340 having its name of "space-time D" is registered onto the map viewer 143 as one of space-time objects. Further, by pushing down "Resister and Continue" button, a search is conducted to find a time point with the same condition ex post facto. If such is found then the space-time can be registered with another name added thereto.

When the condition-matching time point is found on the event-assign past-time space search screen 338, it is also permissible to display the status of each under-management subject at that time on the land map 141 being displayed on the map viewer 143 as shown in FIG. 14. In case the viewability is lost due to the presence of a large number of objects of the subjects being managed, it is also possible to display the property screen 220-2 of FIG. 14 for allowing selection of one under-management subject from the subject menu 2202 to thereby visualize only the information of such selected under-management subject(s). In this case, data entry of a message box 2204 is disabled.

Alternatively, by operating by the mouse or else the status bar 340 named as the "space-time D" also, it is possible to display only the required information while displaying in a similar way the status of each under-management object at that time on the land map 141 being displayed on the map viewer 143 as shown in FIG. 14. Still alternatively, by operating by the mouse or else the "space-time D"-named status bar 340, it is possible while displaying a menu screen 342 to modify the contents of the event-assign past-time space search screen 338 by selecting "Change" which is one of option items of such menu.

When pushing down "Vanish" button, the past-time space object disappears, and the "space-time D"-named status bar 240 is erased from the map viewer 143. When pressing "Copy" button, the menu screen 334 appears enabling a new future-time space object or past-time space object to be created by use of the same space as the space designated by the space object 330.

For example, when selecting "Past-Time Space" which is one of option items of the menu of the menu screen 334, and when choosing "Time Assign" that is one option of a menu of the menu screen 336, a time-assign past-time space search screen 344 is displayed. Let the target subjects be "No Restriction," and then input a sentence "Get status" in a message box, and next designate a time point in the past from "Only Once" menu of this screen, whereby it is possible to grasp the situation of every under-management subject at such time point and then register it as a past-time space. As for a handing method of the past-time space thus prepared and a method of displaying the same are similar in principle to those stated supra.

A plurality of past-time spaces are handleable as a single past-time space object by designating a start time point and repeat time interval plus end time from a menu of "Repeat" of the time-assign past-time space search screen 344. Upon registration of a space-time name (here, "space-time E"), a status bar 343 under the name of "space-time E" is registered as a space-time object on the map viewer 143. By operating this status bar by a mouse 34 or else, a past-time space display controller 345 is displayed.

When pushing down "To Past" button of this controller, display the situation of an under-management subject that is further older in time than a presently displayed under-management subject. When pressing "To Future" button, the situation of an under-management subject that is newer in time than the presently displayed under-management subject is displayed. It is also possible to display the situation of the designated past-time space in the form of a continuous playback screen with its display speed being variable. By operating a past-time space trace bar 349 by the mouse or else, it becomes possible to display a status viewer at any given instant.

Using FIG. 17, a method for realizing the past-time space communication which was stated with reference to FIG. 16 will now be explained. When pushing down "Start" button of the event-assign past-time space search screen 338, the object manager module 184 generates a past-time space object 1330, which then begins to search for more than one object that has existed in a search range (between a present time point and the time for swearing back to the past) from the storage region 1051 used for each object in the hard disk 105. In the case of discovery of an object which has existed at a time within the past search range but is missing at the present, the object manager module 184 recovers this object 1141-41 in the memory 104.

At this time point, any to-be-managed target subject relating to this recovered object 1141-41 does not exist, so the correlation with storage region 1051 for the other objects and generation of icon objects are carried out while establishing no communication paths. In this embodiment, at this stage, objects that have existed at least once within the period of from the present to its preceding thirty days in the past are to be recovered.

Next, the past-time space object 1330 sends a message to the objects under management—i.e., the camera objects 1141-2, sensor objects 1141-3, serviceman objects 1141-4 and customer/client objects—to instruct them to search any under-management subject having conditions matched with the contents of the message box of the event-assign past-time space search screen 338 along with a time point thereof.

The under-management subject having its state matched with the adaptation conditions within the thirty-day past period from the present returns a message indicating such fact along with its time and event contents toward the past-time space object 1330. The past-time space object 1330 requests the head officer 12 to make a decision as to whether a prosecution is continued or not after registration. If the head officer 12 instructs "Register and continue," then generate another past-time space object 1330-2 while at the same time retaining the above-noted message together with its time and event contents. The past-time space object 1330-2 thus generated by the past-time space object 1330 performs similar processing for searching certain states which satisfy the conditions, which will be registered as new past-time spaces once at a time when found.

Next, when the head officer 12 operates by the mouse 24 or else the "space-time D"-named status bar 340 to display the menu screen 342 and then selects "Display" which is one of options of such menu, the past-time space object 1330 designates the message and its time along with the event contents as held in the object of interest and then instructs the objects under management—i.e., the camera objects 1141-2, sensor objects 1141-3, serviceman objects 1141-4 and customer/client objects—to notify the status of each object at that time point.

The past-time space object 1330's executing the above-noted processing results in the status of under-management subject of space-time in the past at the "that time" being displayed in the form of FIG. 14. The "Only Once" menu of the time-assign past-time space search screen 344 is also realizable by methodology similar to the method above.

In the case of "Repeat" menu of the time-assign past-time space search screen 344, the past-time space object 1330 owns a plurality of time points equal to the "that time," which may be realized by implementing a method similar to that stated supra every time the button of the past-time space display controller 345 is pushed down or every time the past-time space trace bar 349 is operated by the mouse or else or alternatively realized at a frequency of double speed when the double-speed display is designated. Note here that in this case, erasure of any previous display is notified to each object prior to doing new display.

The immediate space object and future-time space object plus past-time space object which has been discussed in this embodiment are the ones that operate uniquely, rather than those in which a given space-time object affects system operations and the remaining objects, including other space-time objects.

Embodiment 2

An embodiment 2 is generally similar, except partial designs, to the embodiment 1 in system configuration and system hardware and software components as built therein.

FIG. 19 is a diagram showing a software configuration of a message communication device 70 of this embodiment, which is the same as that of FIG. 9, except that a space-time control module 761 is added thereto.

This embodiment enables achievement of highly reliable message transmission even when target subjects under management are large in number.

FIG. 13 is a diagram showing a method for designating a given space of a land map 141 being displayed on a map viewer 143 and for performing instruction to an under-management subject(s) belonging to this space. Here, the position of a message communication device 70-1 to which a coping member or serviceman 1-1 belongs becomes the one that is assigned by surveillance/monitor console control device 20 or is sent by the message communication device 70-1 per se toward a serviceman object 1141-4 at appropriate preset tracking time intervals. Consequently, when realizing immediate communication such as shown in FIG. 13, the position indicated by the serviceman object 1141-4 on land map 141 becomes different from the position at which the serviceman 1-1 actually exists.

In the embodiment 1, when supposing for example that servicemen who are under-management subjects are 60,000 persons with the tracking performance of the monitor console control device 20 being set to 60 persons per second, the tracking time interval is required to be 1000 seconds. Assuming that a serviceman walks at a speed of 4 km per hour, it will possibly happen that a difference between a position indicated by the serviceman object 1141-4 and the position whereat the serviceman 1-1 actually exists becomes 1 km or more. In case the serviceman is moving by means of a land vehicle or bicycle, such difference becomes much larger. Thus, it can happen that a message is not received by the serviceman who belongs to the space of interest, such as when the space assigned by land map 141 is less than a circle with its diameter of 1 km.

This embodiment offers an ability to reliably perform the message transmission even in the case stated above: the serviceman object 1141-4 performs processing which follows. Additionally this processing may be done in a way parallel to the processing of the embodiment 1.

Upon detection of addition of an immediate communication object 1200 of FIG. 17, the serviceman object 1141-4 acquires from this serviceman object 1141-4 the space information that a space object 200 makes up. Examples are the coordinates of a center point in a two-dimensional (2D) plane constituted by the space object 200 and a distance of its radius. Alternatively, the immediate communication object 1200 may be arranged to send corresponding space information to the serviceman object 1141-4 in a reverse way thereto.

FIG. 20 shows the criterion of judgment in case immediate space object information is sent to the message communication device 70-1.

The serviceman object 1141-4 compares the position coordinates of the message communication device 70-1 of serviceman 1-1 owned by the serviceman object 1141-4 to the space information constituted by the space object 200. And, in case the position coordinates of the serviceman's message communication device are contained in not only the space 200 but also a wide space (200-1) which includes this space, or alternatively in case (200-2) a movement vector is calculated from the position coordinates of the serviceman in the past and then it is judged that there is the possibility that it presently belongs to this space, the serviceman object 1141-4 sends to the message communication device 70-1 the space information constituted by the space object 200 that was acquired from the immediate communication object 1200.

The message communication device 70-1 receives at its space-time control module 761 the space information via a network control driver 772 and communication manager module 770 of FIG. 19. The space-time control module 761 immediately acquires a present position of message communication device 70-1 from GPS receiver 726 through a sensor control module 752 and input/output device control driver 750 plus the GPS receiver module 724 shown in FIG. 5 and judges whether the message communication device 70-1 is belonging to the space of interest and then notifies its result to the serviceman object 1141-4 via communication manager module 770 and network control driver 772 of FIG. 19.

When receiving from the message communication device 70-1 the information indicating that the target is belonging to this space, the serviceman object 1141-4 notifies it to the immediate communication object 1200. This immediate communication object 1200 sends a message of message box 2064 to the serviceman object 1141-4. Further, the serviceman object 1141-4 transfers it to the message communication device 70-1. This message is displayed on a monitor 718 via the network control driver 772, communication manager module 770 and monitor control processing module 760 and also the monitor controller 716 of FIG. 5.

By execution of the processing above, it becomes possible to reliably send the message by letting the message communication device 70-1 per se report its own position information even in the event that the servicemen are extra-large in number when compared to the tracking performance of the monitoring console control device 20.

In the case of realizing future space-time communication, with regard to tracking performance problems occurring when execution of the above-noted immediate communication, it is difficult at a present stage to predict the position at a future time point or time period of the message communication device owned by serviceman 1-1, so it is deficient to add such future time period or time point to the space information in the above-stated method.

Additionally, it is not preferable to send forth the information constituted by the future-time space toward message communication devices of those servicemen who have apparently no relationship to the time point or time period or position that the future space-time makes up, because it results in an increase in communication costs and also a time required for such communication is no longer negligible.

This is self-obvious when considering, for example, the length of a time taken to send the information for designating a future-time space that is related to Tokyo district only toward thousands or several ten thousands of servicemen's message communication devices which are dispersively expanded across the whole country and then finish to send all such messages. There is conceivable without doubt the situation where it has passed the time point or time period when the transmission of all the messages is completed.

In view of this, a description will be given of one preferred form of a method for predicting a highly probable under-management subject belonging to the future-time space such as shown in FIG. 15 and for sending thereto the future-time space designating information. This processing may be done in a way parallel to the processing of the embodiment 1.

Upon detection of addition of a future-time space object 1230 shown in FIG. 17, the serviceman object 1141-4 acquires therefrom the space information and time information involved in the future-time space object 1230. Alternatively, adversely, the future-time space object 1230 may be arranged to send the information of corresponding space or time point or time toward the serviceman object 1141-4.

The space information that the space object 230 makes up refers for example to the center coordinates of a 2D circular plane and its radius distance or the like, whereas the time information of the space object 230 refers for example to a start time point, continuation time and/or repeat time interval as designated by the time assign message send screen 244 or 238 of FIG. 15.

In case the serviceman object 1141-4 compares the position coordinates of a serviceman owned by serviceman object 1141-4 to the space information and time information of space object 230 and then judges the position coordinates of the serviceman 1-1's message communication device 70-1 is possibly contained in the space of interest at the time or time point, send to the message communication device 70-1 both the space information and time information of the space object 230 which have been acquired from the future-time space object 1230.

FIG. 21 depicts a criterion for the serviceman object 1141-4 to judge the possibility that the serviceman 1-1's message communication device 70-1 is included in the space at the time or the time point.

The space information and time information owned by the future-time space object 1230 are a space 230 indicated by 2D coordinates x-y and a start time 13:45 and continuation time of 1 hour and 15 minutes (end time is 15:00), respectively. More specifically, FIG. 21 exemplifies transmission of a message to the serviceman's message communication device which has belonged to the space 230 within a period of from 13:45 up to 15:00. Hereafter, the time of 13:45 to 15:00 in a space 200-2 and the space will be called the "space-time E."

Firstly, the serviceman object 1141-4 uses the newest position information which was received from the message communication device 70-1 owned by the serviceman 1-1 at an instant thirty minutes before the space-time E to examine whether the serviceman 1-1 is belonging to a wide space 230-3 which involves the space 200-2.

Such wide space is used in order to guarantee the possibility that the serviceman object 1141-4 belongs to the space-time E thirty minutes later and because of the consideration of a difference between the position information of the serviceman 1-1 owned by the serviceman object 1141-4 and the real position of serviceman 1-1 at the time point.

Furthermore, a movement vector is calculated from the past position coordinates of the serviceman 1-1 to thereby examine whether it has a possibility for belonging to the space-time E. Regarding this possibility, a decision may be done based on determination as to whether the position coordinates to be predicted within the above-noted time zone spanning from 13:45 to 15:00 as calculated from the movement vector that was calculated from the position coordinates of the serviceman 1-1 is included or not in a space 230-2 at the time point of 13:45 and in a space 230-4 at the instant of 13:30.

In this way, in case it was judged that the position of the serviceman 1-1's message communication device 70-1 owned by the serviceman object 1141-4 at a present stage belongs to the space 230-3 or possibly belongs to the space-time E, the serviceman object 1141-4 sends to this message communication device 70-1 the information of the space-time E which was acquired from the future-time space object 1230.

Next, the serviceman object 1141-4 uses at a timing fifteen minutes before the start time of the space-time E the serviceman 1-1's position information owned by the serviceman object 1141-4, i.e., the last position information as acquired from the message communication device 70-1 owned by the serviceman 1-1, to examine whether the serviceman 1-1's message communication device 70-1 is belonging to the space 230-4 which contains the space 230 and which is narrower than the wide space 230-3.

This is in order to guarantee the possibility that the serviceman object 1141-4 belongs to the space-time E fifteen minutes after and because of the consideration of a difference between the position information of the serviceman 1-1 owned by the serviceman object 1141-4 and the actual position of serviceman 1-1 at the time point.

Additionally, calculate a movement vector from the position coordinates of the serviceman 1-1 in the past; then, reexamine whether there is the possibility of belonging to the space-time E.

In this way, in case it was judged that the position of the serviceman 1-1's message communication device 70-1 owned by the serviceman object 1141-4 at a present stage belongs to the space 230-4 or possibly belongs to the space-time E, the serviceman object 1141-4 sends to this message communication device 70-1 the information of the space-time E which was acquired from the future-time space object 1230. Note here that if the information of space-time E has already been sent to the message communication device 70-1 then resending is not performed.

Further, the serviceman object 1141-4 uses, at respective time points with an interval of fifteen minutes within a period of from the space-time E's start time 13:45 to end time 15:00, the information of the serviceman 1-1 owned by the serviceman object 1141-4, i.e., the last updated position information acquired from the message communication device 70-1 owned by the serviceman 1-1, to examine whether the serviceman 1-1 is belonging to the space 230 and further calculates a movement vector from the position coordinates of the serviceman 1-1 in the past to thereby examine whether it possibly belongs to the space-time E.

In case it was judged that there is the possibility of belonging to the space-time E, the serviceman object 1141-4 transmits to the message communication device 70-1 the information of space-time E which was acquired from the future-time space object 1230. Obviously if the information of space-time E has already been sent to the message communication device 70-1 then avoid resending thereof.

Next, an explanation will be given of the message communication device 70-1 which receives the information of space-time E.

In the message communication device 70-1, its space-time control module 761 receives the information of space-time E via a network control driver 772, communication manager module 770 of FIG. 21.

Here, the space-time control module 761 records this space-time E in its built-in memory. When it becomes 13:45 which is the start time of space-time E, the space-time control module 761 acquires at preset regular time intervals (e.g., at intervals of ten seconds) a present position of the message communication device 70-1 from GPS receiver 726 via the sensor control processing module 752 and input/output device control driver 750 plus the GPS receiver module 724 shown in FIG. 5 until it becomes the end time point 15:00 of the space-time E to thereby check whether the message communication device 70-1 is belonging to the space-time E.

When the space-time control module 761 determines the communication device 70-1 belongs to the space-time E, immediately notify it to the serviceman object 1141-4 by way of the communication manager module 770 and network control driver 772 of FIG. 21.

Upon receipt of the information indicating that the target is belonging to this space from the message communication device 70-1, the serviceman object 1141-4 notifies it to the future-time space object 1230. This future-time space object 1230 sends to the serviceman object 1141-4 either a message of the message box of time assign message screen 244 or a message of the message box of time assign message screen 238; further, the serviceman object 1141-4 transfers it to the message communication device 70-1. This message is displayed on the monitor 718 via the network control driver 772, communication manager module 770 and monitor control processing module 760 along with the monitor controller 716 of FIG. 5.

The space-time control module 761 is designed to erase the information of space-time E being recorded in the memory after the elapse of a duration thereof.

In addition, the space-time control module 761 is capable of storing a plurality of space-time information items and also executing the processing per each space-time.

When realizing the past-time space communication such as shown in FIG. 16, a difference can sometimes occur between the tracking information owned by the serviceman object 1141-4 and the tracking information owned by the message communication device 70-1. An example of such case is that the serviceman object 1141-4 performs updating of the position information once per elapse of fifteen minutes whereas the message communication device 70-1 performs position measurement in a self-sustained manner and retains position measurement data once per elapse of ten seconds, by way of example.

When information with higher accuracy is required in cases where information in the past is collected using the past-time space concept, it is desirable to use high-accuracy tracking information of the message communication device 70-1.

Consequently there will be described below one form of a method for predicting an under-management subject that belonged to the space of interest at such time point or in the time period—that is, a target subject that is high in probability of having belonged to the past space-time—and then sending thereto the information for designation of past-time space. This processing may be performed while being added to the processing of the embodiment 1.

FIG. 22 shows the judgment criteria in the case of transmission of past-time space object information.

Upon detection of the addition of a past-time space object 1330, the serviceman object 1141-4 acquires from this past-time space object 1330 the space information and time information that the space object 330 makes up. A space and time as made up of the space information and time information will here be called a space-time H.

Here, the space information of the space object 330 refers for example to the center coordinates of a 2D circular plane and its radius distance or else whereas the time information refers for example to a time point (past time only), repeat start time point, repeat time interval, end time, start time of search range, or swear-back time as assigned on the time assign message send screen 244 or 238 of FIG. 16.

The serviceman object 1141-4 compares the position coordinates of message communication device 70-1 of serviceman 1-1 owned by serviceman object 1141-4 to the space information and time information of space-time H. When it judged the position coordinates of message communication device 70-1 of serviceman 1-1 was possibly included in the space-time H at the time or time point, send to the message communication device 70-1 the information as to designation of the space-time H as has been acquired from the past-time space object 1330.

A method for determining whether it was possibly included in the space-time H is as follows: judgment is made by comparing the past history of the space-time of more than one serviceman being recorded in the object-use storage region 1051 of FIG. 17 to the information of the space-time H or of a space-time made up of a wider space than the space-time H and a time point. The space-time wider than the space-time H is used because of taking into consideration a difference between the past history of the position coordinates of the serviceman owned by the serviceman object 1141-4 and a real position of the position information of such serviceman 1-1.

Shown in FIG. 22 are the space-time H consisting essentially of a space object 330 and start time point 11:05 plus end time 11:50 and a space-time H' made up of a space and time wider than space-time H.

When it was judged that the serviceman object 1141-4 was possibly included in the space-time H, send to the message communication device 70-1 the information of space-time H as has been acquired from the past-time space object 1330.

The message communication device 70-1 receives this space information at its space-time control module 761 via the network control driver 772 and communication manager module 770 of FIG. 21. The space-time control module 761 immediately takes out of the hard disk 836 the information making up the space-time belonging to this space-time H through the hard disk controller 737 shown in FIG. 5 and then quickly notifies its result to the serviceman object 1141-4 via the communication manager module 770 and network control driver 772.

The serviceman object 1141-4 notifies it to the past-time space object 1330, followed by execution of similar processing to that in the embodiment 1.

Embodiment 3

Although the space used in the embodiment 1 or embodiment 2 is the one that is representable by formula (s) such as a circle or ellipse (also including rectangular solids or trapezoids which are definable by linear forms), a description below is related to a scheme for designating a space which is not limited to formula-based representations.

FIG. 23 is a diagram showing a space which belongs to Kanagawa prefecture in Japan.

After having acquired upper-left and lower-right position coordinates of a rectangular space which involves an entire area of Kanagawa prefecture, let this space be subdivided into a plurality of square spaces having a certain distance (here, 2100 meters)-here, 151 division into a matrix of 14 by 11. When a land area belonging to Kanagawa prefecture occupies more than half within a divided space, let this divided space be flagged with "1"; otherwise, flag it with "0."

By doing in this way, space designation is enabled without exclusive limitation to geographical spaces by using certain information representing a land map along with the upper-left/lower-right coordinates, divided space's row/column number and distance of one side of divided space. Additionally the information which represents the land map of FIG. 23 is mere data with a text of twenty ASCII letters.

It is possible for the head officer 12 to use the mouse 23 or else to define any given space on the land map 141 being displayed on the map viewer 143 as a space-time object.

For the immediate communication object 1200, future-time space object 1230, past-time space object 1330, camera objects 1141-2, sensor objects 1141-3, serviceman objects 1141-4 and space-time control modules 761 of message communication devices 70-1, the use of the above-noted information makes it possible to perform the implementation of the embodiment 1 or embodiment 2 using spaces with no limitation to geographical spaces.

Although in this embodiment the graphic form involving a target space is designed as a rectangle while letting the divided spaces be squares, these may be modified to circles, rectangles or other shapes with the divided space size also being alterable for any purpose. It is also permissible to use in combination the geographical space representation method and the scheme stated herein.

Further, although the embodiment 2 uses the concept of "wider space than the space of interest," such "wider space" is readily preparable by adequate processing techniques, such as a process for flagging "1" to a "0"-flagged space which resides next to the "1"-flagged space that occupies the space.

Optionally, the space as used in the embodiment 1 or embodiment 2 may alternatively be a cell(s) in cellular schemes of mobile phones.

Additionally the position measurement method of the cameras 30, sensors 50 and message communication devices 70 in the embodiment 1 or embodiment 2 include, other than the method using independent position measuring equipment such as GPS or else, position measurement schemes as provided by wireless LANs or carriers, position specifying methods using network addresses (e.g., segment data of IP addresses), and methods for permitting manual data entry by users or administrators of the cameras 30, sensors 50 and message communication devices 70, with no special restrictions being applied thereto.

Embodiment 4

FIGS. 24-25 are diagrams showing exemplary events when applying this invention to services in the railway/traffic field.

FIG. 24 shows that it becomes possible, by having sent in advance a message(s) to a space near or around an accident-occurred land spot, to send a message(s) toward a station or train belonging to this space without limiting the station or train.

In this way it is possible to perform message communication to any designated space(s) at an assigned time or time point without having to take into consideration what type of communication targets (stations, electric railcars) are actually present in the space of interest, while making it possible to send a message(s) in a way irrespective of the type (stations, electric railcars) and/or nature (moving, not moving, etc.) of such communication targets. In FIG. 25, an embodiment is shown which employs in a user's mobile phone the functionality of the monitor console control device 20 in the embodiment 1. Note that in this embodiment, only part of the monitor console control device 20—e.g., only the function of common use of a screen with the monitor console control device 20—may be employed. Shown herein is a service for notifying detection when the user designates a pass from his or her mobile phone (here, a bus for a station X in front of a shopping street) and then detected an incoming motor bus in the designated space within a time period (here, from 7:30 to 7:40). With this service, the user may go to a bus stop without regard to any bus schedule disturbance so that it becomes unnecessary to long wait for a bus at the bus stop.

As apparent from the foregoing, this embodiment is the one that enables notification to the user's cellular phone having the function of the monitor console control device 20 with an event being as a trigger therefor, which event is not only an alarm from an immovably installed communication target as exemplified by blinking of a sensor icon object 141-3 being displayed on the land map 141 shown in FIG. 12 but also a time point whereat the moving object belongs to the space-time. It is also possible to restrict the notification conditions by addition of the nature of a moving object (here, a bus which travels from the shopping street A to station X).

Additionally, designating a space enables online delivery of an advertisement message pursuant to the space. For example, sending an ad message while designating a nearby area of a newly built apartment house makes it possible for bus passengers to receive a message saying "Model room of apartment 'AAA' seen on your right-hand side is very near from the next stop! You can visit there by 8 p.m." when coming closer to the apartment.

In this way, the illustrative embodiment enables assignment of message transmission by taking account of the travelling direction (movement vector) of the passengers who are expected to receive the ad message for permitting direction designation such as "apartment seen on your right-hand side" and/or the time that passengers pass through the space near the apartment of interest such as in the form of the message of "you can visit there by 8 p.m." in addition to the fact that the passengers are being on the bus (e.g., detection is obtainable such as the velocity relevant to such passenger movement becoming 0 km at a specific location (bus stop or else)).

Note that this embodiment shown in FIG. 24 or 25 is realizable by the practicing form of the embodiment 1.

Embodiment 5

FIG. 26 is a diagram showing an example which applies this invention to an office environment.

In this implementation, an e-mail which prompts document submission at regular intervals from a certain time is delivered everyday not only to a personnel "A" but also to persons who belong to a designated vicinal space of the "A."

With the email delivery, the email is sent not only to the personnel "A" but also to office associates of such person "A," so it is possible for a coworker in the same team to handle the matter even when the person "A" is absent from work or is on a business trip, thereby attaining contribution to expediency of business tasks.

As this embodiment is for email transmission in accordance with seat positions, the email will hardly reach the aimed office associates by mere designation of the seat positions in case a supervisor of the target person A resides on another floor or alternatively the coworker is temporarily dispatched to another division for example. If this is the case, simply register the position coordinate data of such supervisor or dispatched coworker as the coordinate information of a nearby area of the coordinates of person "A," thereby enabling attainment of the advantages of this embodiment even in the physical absence at such nearby area.

Additionally this embodiment shown in FIG. 26 is realizable by the practicing form of the embodiment 1.

Embodiment 6

FIG. 27 shows that this invention is applied to a queue of people at amusement facility for avoiding problems in the case of having to get in line.

The activity to keep standing at the same location for a long time can often cause pain for certain persons, e.g., parents with a baby who irregularly requires lactation or diaper change, aged persons who need care and children with the lack of patience for quietly waiting in the same location (see upper part of FIG. 27).

Using this embodiment permits automatic or manual registration of a mobile phone number or email address when ticket issuance is made at ticket issuing machines and then makes it possible to invoke at prespecified time intervals (e.g., ten seconds) a visitor who wants to enter the attraction hall of interest and who is within a nearby area of an entrance thereof (e.g., within a distance of 200 meters) in accordance with the priority order of the ticket issuance at ticket issuing machines while enabling the person who is in charge of people entry management to give admission to entry after having affirmed that the person of interest is a legitimately authorized visitor while looking at the display screen of his or her cellular phone.

An architectural scheme of this embodiment will be explained using FIG. 17.

Suppose that the issuance of a ticket at a ticket selling machine results in generation of an object 1141-4 of a person who wants to enter the hall as a listener or spectator, which object retains his or her telephone number or email address along with a serial number of the ticket. Upon issuance of a ticket of the next hall-entry wanter, another hall-entry wanter object is generated to have its own ID, which is registered to the object 1141-4 also. These objects are to be linked and coupled together in the order of registration thereof.

Even within a period of from the start of attraction hall entry to the beginning of attraction, hall-entry wanter objects are generated and coupled by linkage in a similar procedure to that stated above.

A future-time space 1230 with registration of an attraction-hall entry start time point and a hall-entry notice space begins startup when it becomes the hall-entry start time point and then transfers a message (such as "Please enter") to every object of the hall-entry wanter belonging to the space; however, the entry wanter's object does not immediately send such message to the entry wanter but goes into standby until receipt of a message transmission completion report from another hall-entry wanter who was registered immediately before its preceding wanter object.

Additionally, after having sent the message, e.g., after having waited for ten seconds, the hall-entry wanter's object sends a message transmission completion report to the object immediately after completion of registration of the entry wanter's object. The object which received this report (another hall-entry wanter's object) sends a message (such as "Please enter") to the entry wanter.

Even for hall-entry wanter objects added within a period of from the startup of attraction hall entry to the curtain-raising of such attraction, transfer the message (such as "Pls. enter") thereto when the future-time space object 1230 detected such addition.

Since messages are not sent to the objects simultaneously but are sequentially forwarded thereto in the registration order of visitors who want to enter the hall, they are virtually lined up without having to keep under restraint to the location of a physical queue and, for this reason, are free from any bodily pain such as lineup with the queue, which is also devoted to preclusion of congestion at or near the hall entrance.

While the description above is drawn to specific embodiments, it will readily occur to those skilled in the art that this invention should not exclusively be limited thereto and various modifications may be made without departing from the spirit and scope of the invention as defined by the appended claims.

INDUSTRIAL APPLICABILITY

In accordance with this invention, it becomes possible to perform message communications while designating a space and a respective time period(s) or time points at present, in past, and in future.

Figure 1:
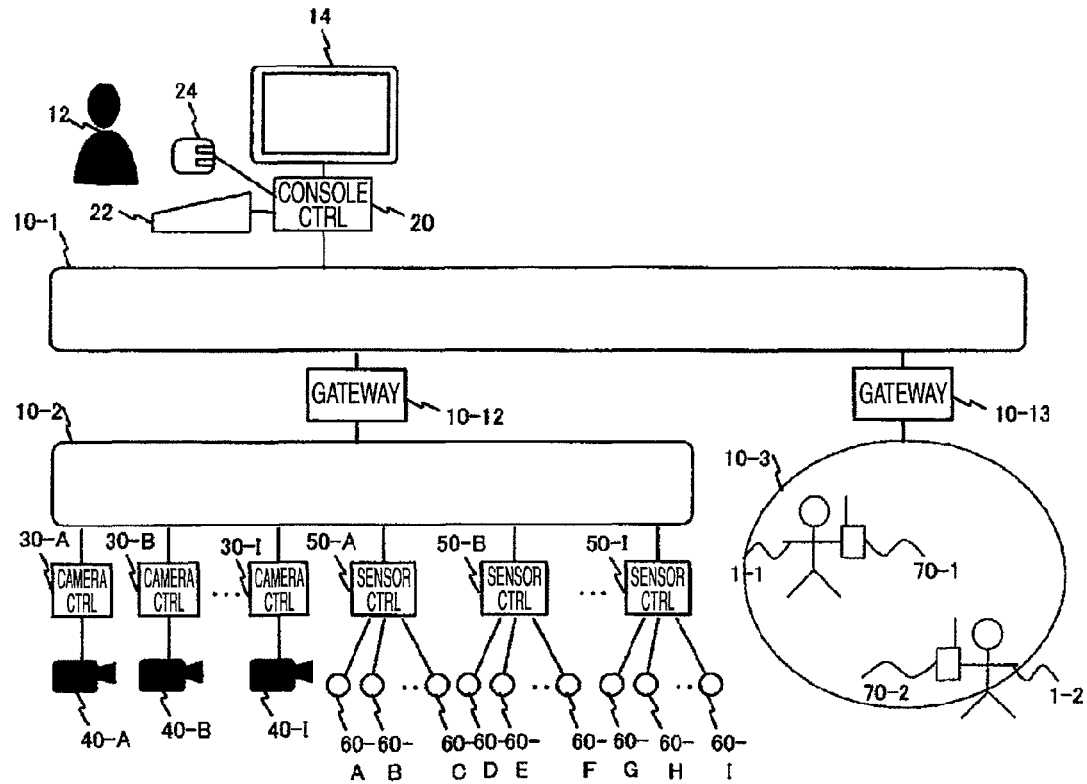
FIG. 1 is a diagram showing a system configuration of a surveillance system in accordance with an embodiment 1 of this invention.
Figure 2:
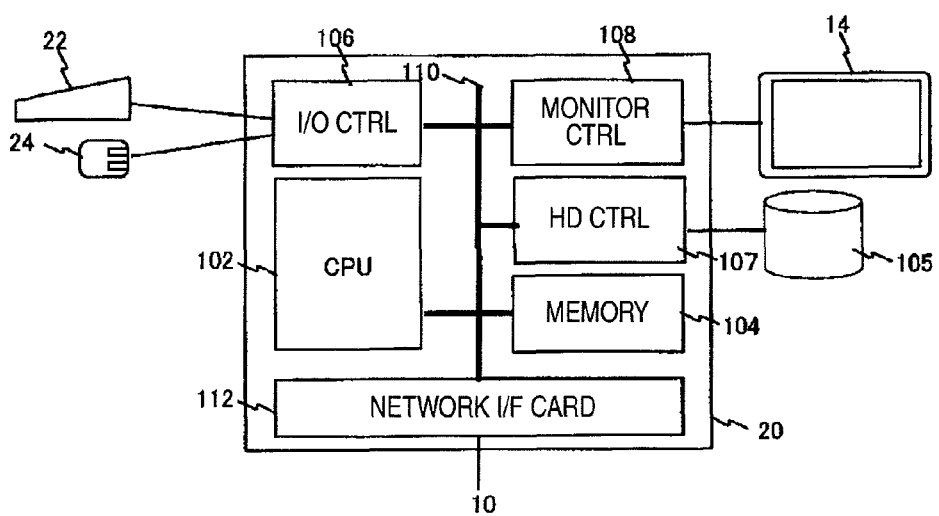
FIG. 2 is a diagram showing a hardware configuration of a monitoring console control device 20.
Figure 3:
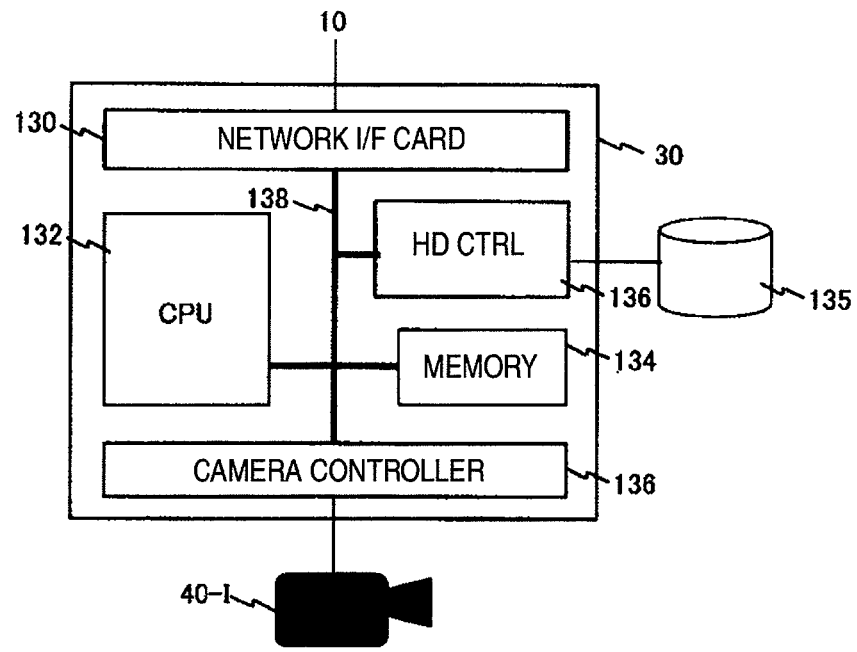
FIG. 3 is a diagram showing a hardware arrangement of a camera control device 30.
Figure 4:
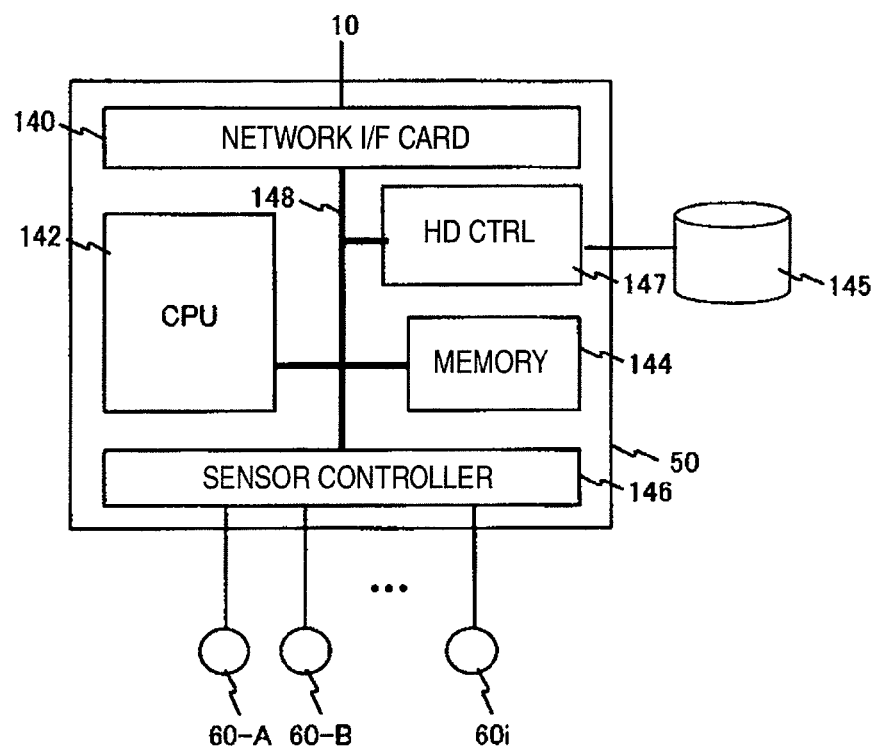
FIG. 4 is a diagram showing a hardware configuration of a sensor control device 50.
Figure 5:
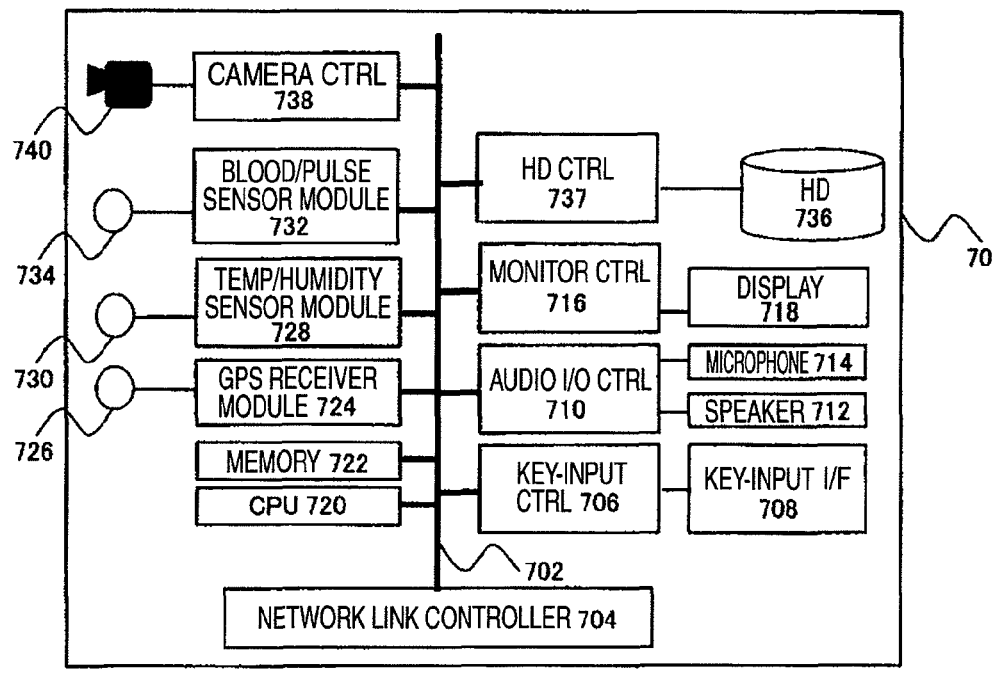
FIG. 5 is a diagram showing a hardware configuration of a message communication device 70.
Figure 6:
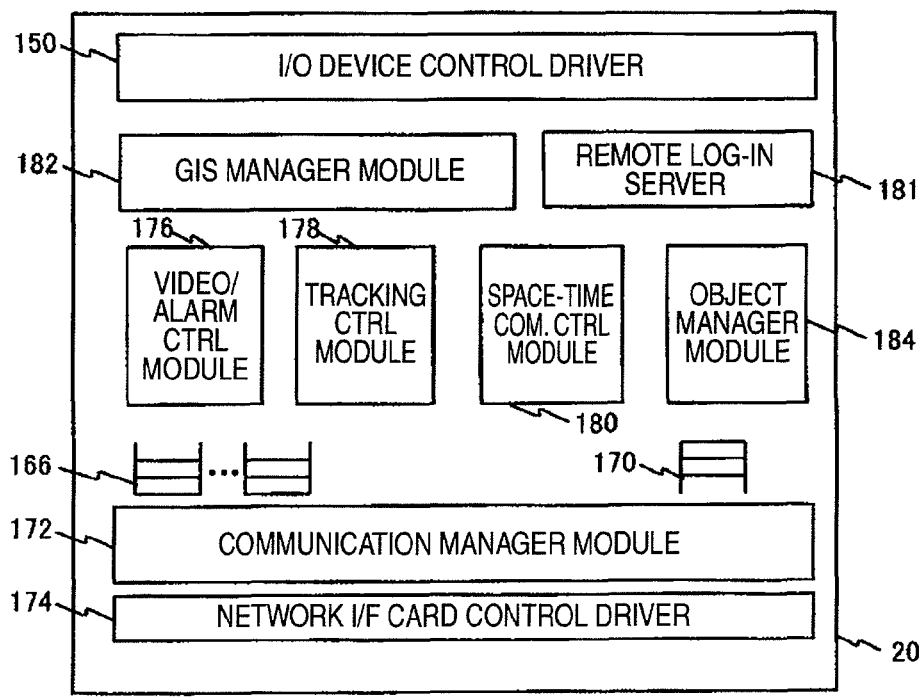
FIG. 6 is a diagram showing a software configuration of the monitoring console control device 20.
Figure 7:
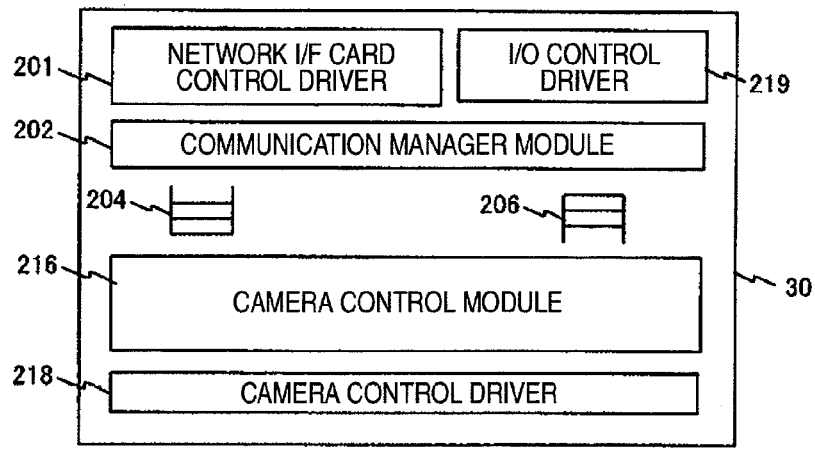
FIG. 7 is a diagram showing a software arrangement of the camera control device 30.
Figure 8:
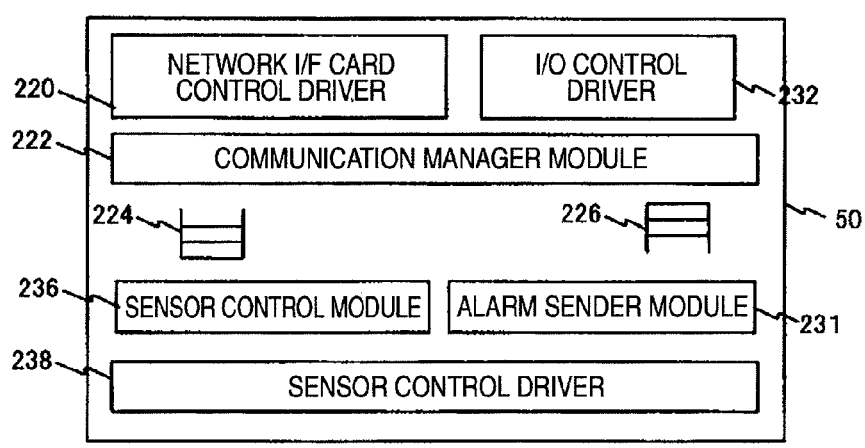
FIG. 8 is a diagram showing a software configuration of the sensor control device 50.
Figure 9:
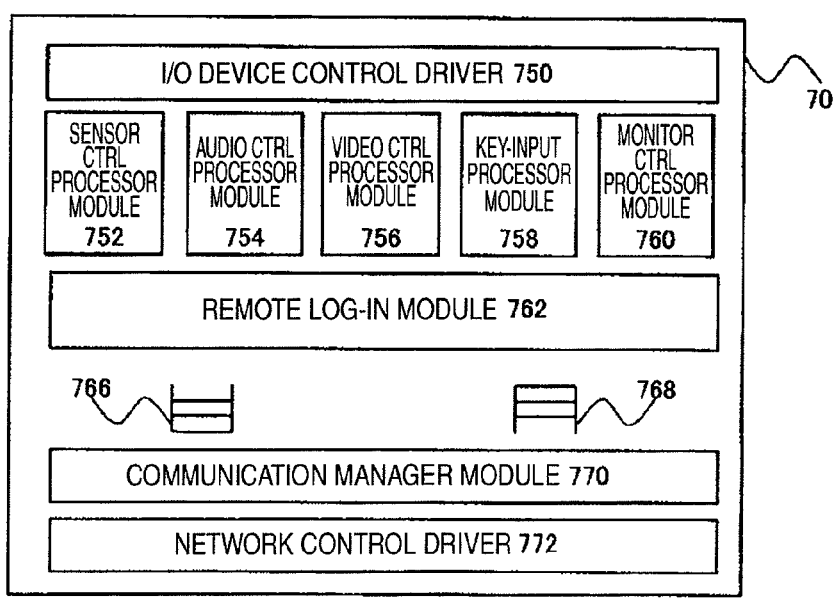
FIG. 9 is a diagram showing a software configuration of the message communication device 70.
Figure 10:
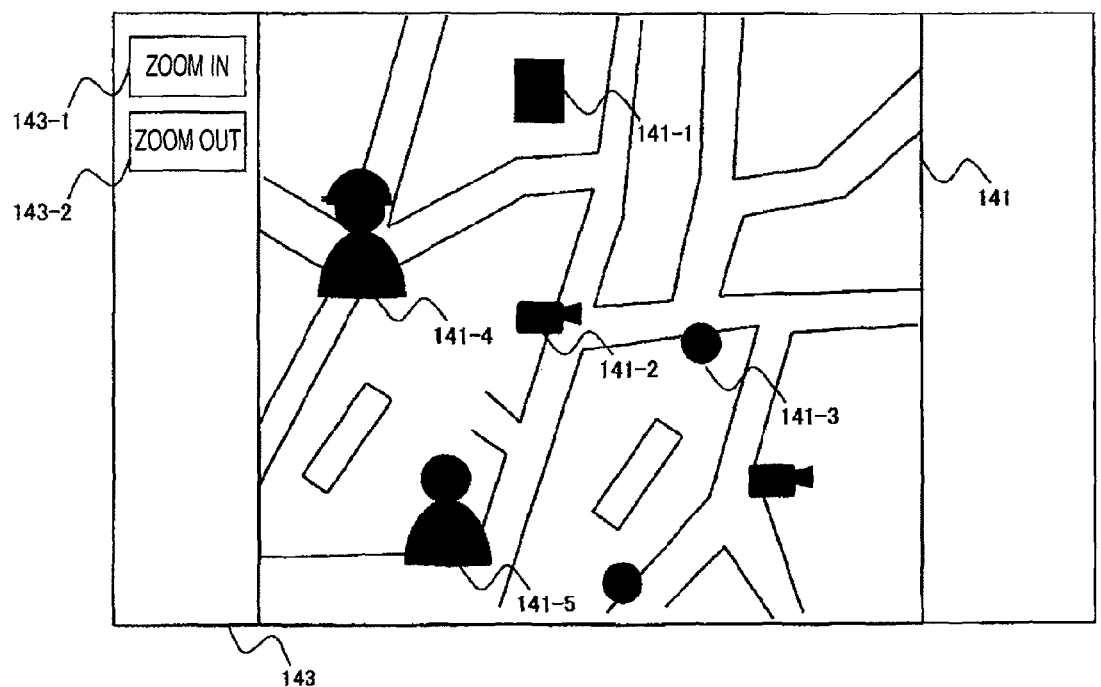
FIG. 10 is a diagram showing a land map 141 on a map viewer 143.
Figure 11:
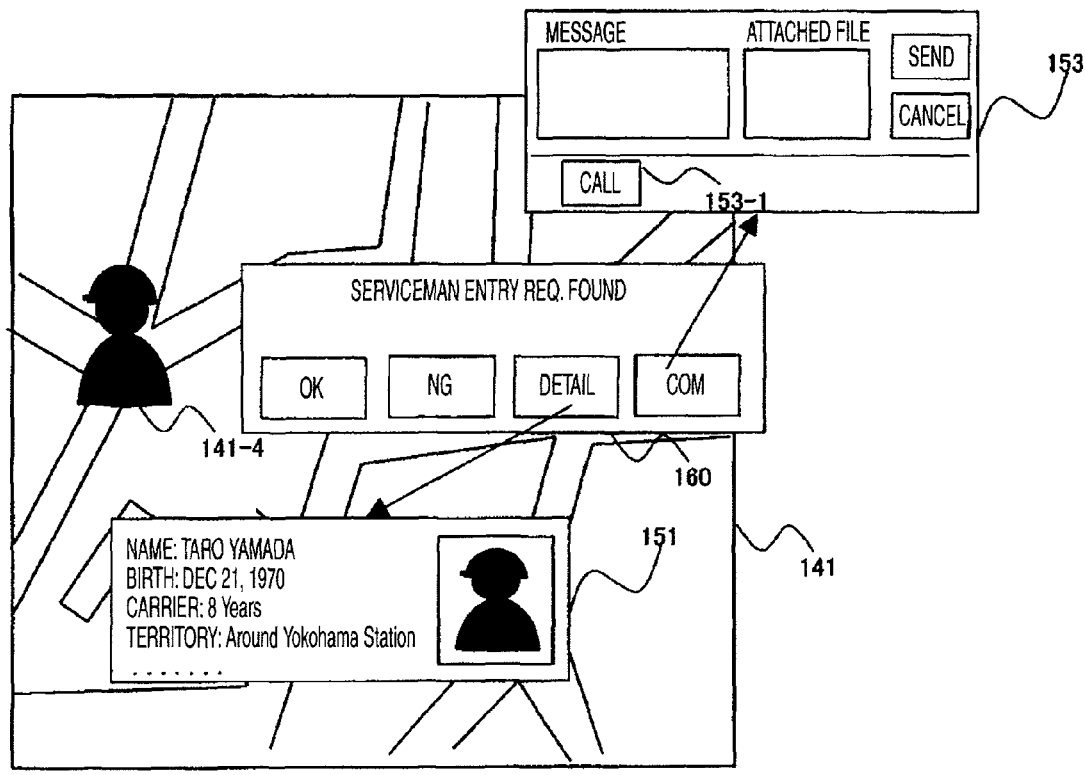
FIG. 11 is a diagram showing the processing for system entry and drop-out of a target object being managed.
Figure 12:
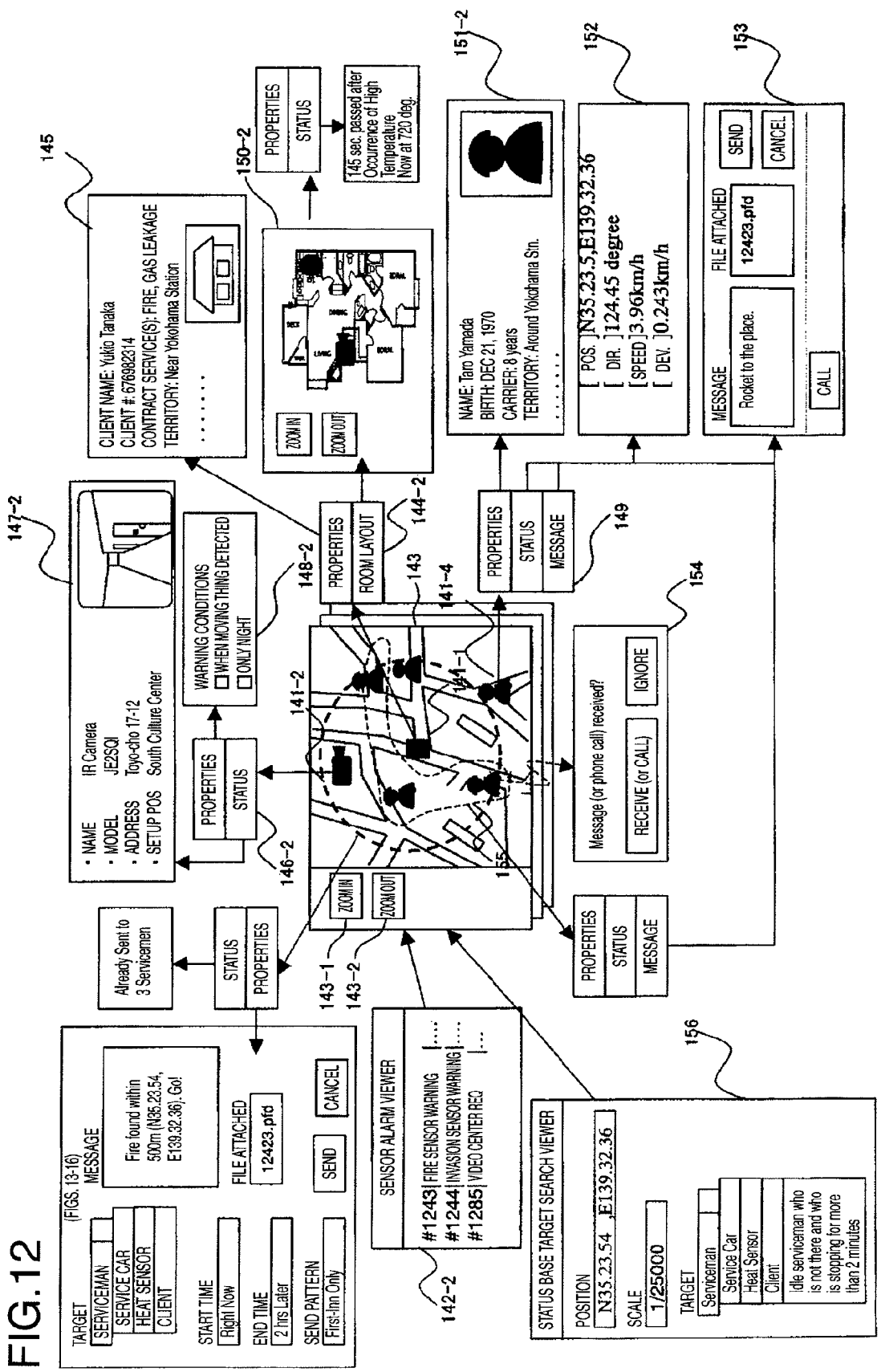
FIG. 12 is a diagram showing windows and viewers to be displayed on a monitor 14.
Figure 13:
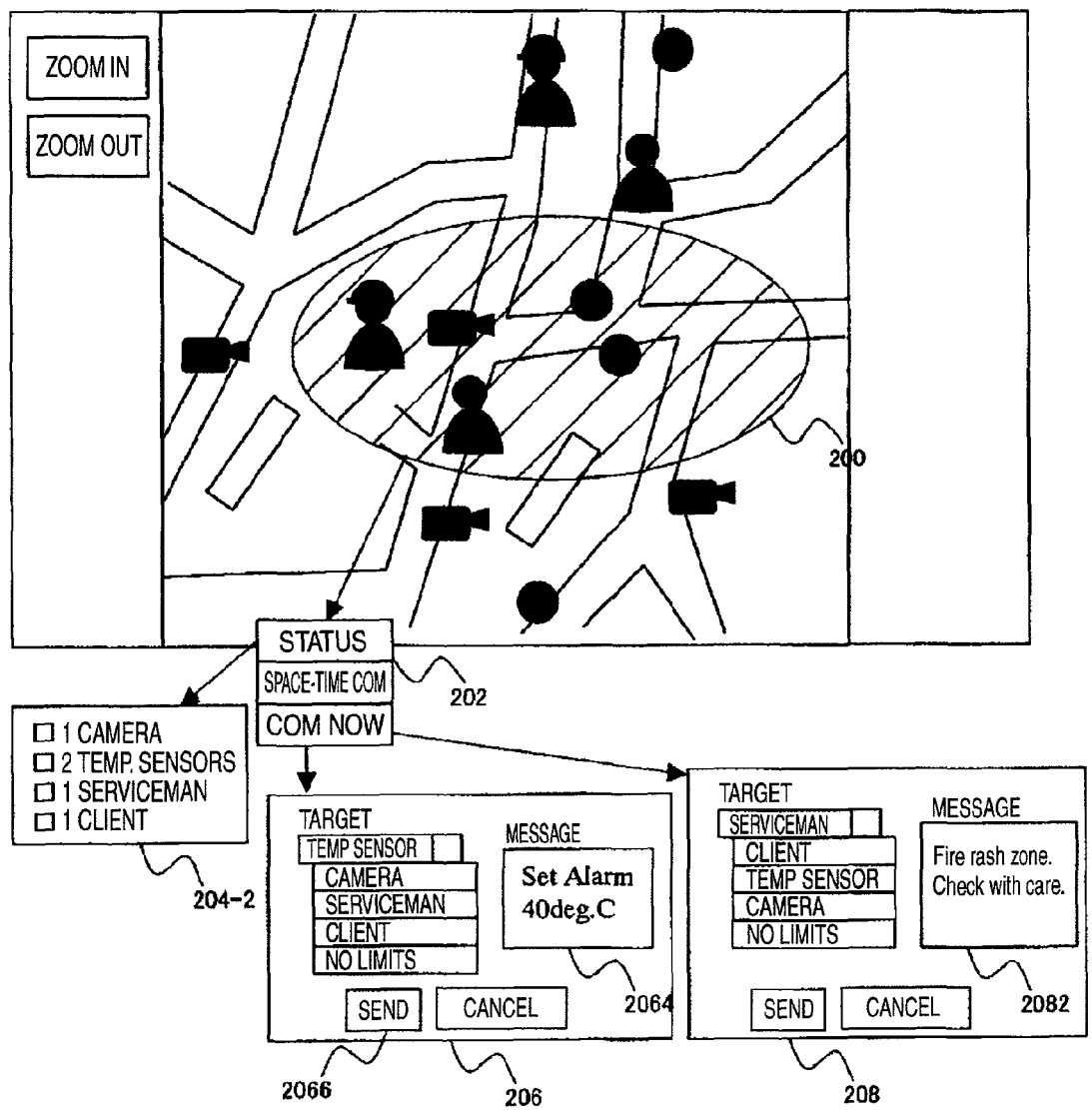
FIG. 13 is a diagram showing a flow of immediate space communication processing.
Figure 14:
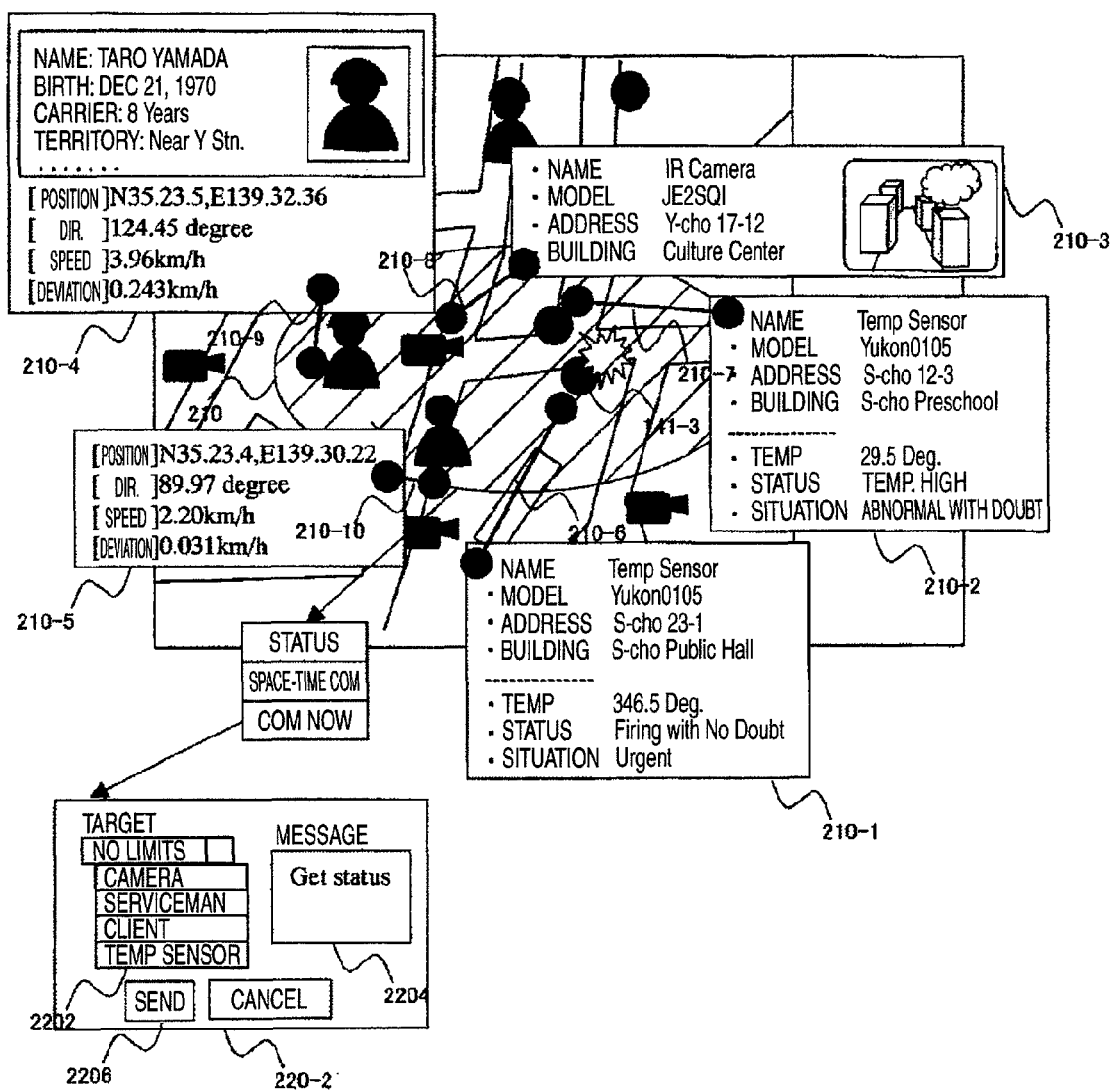
FIG. 14 is a diagram showing a flow of the immediate space communication processing.
Figure 15:
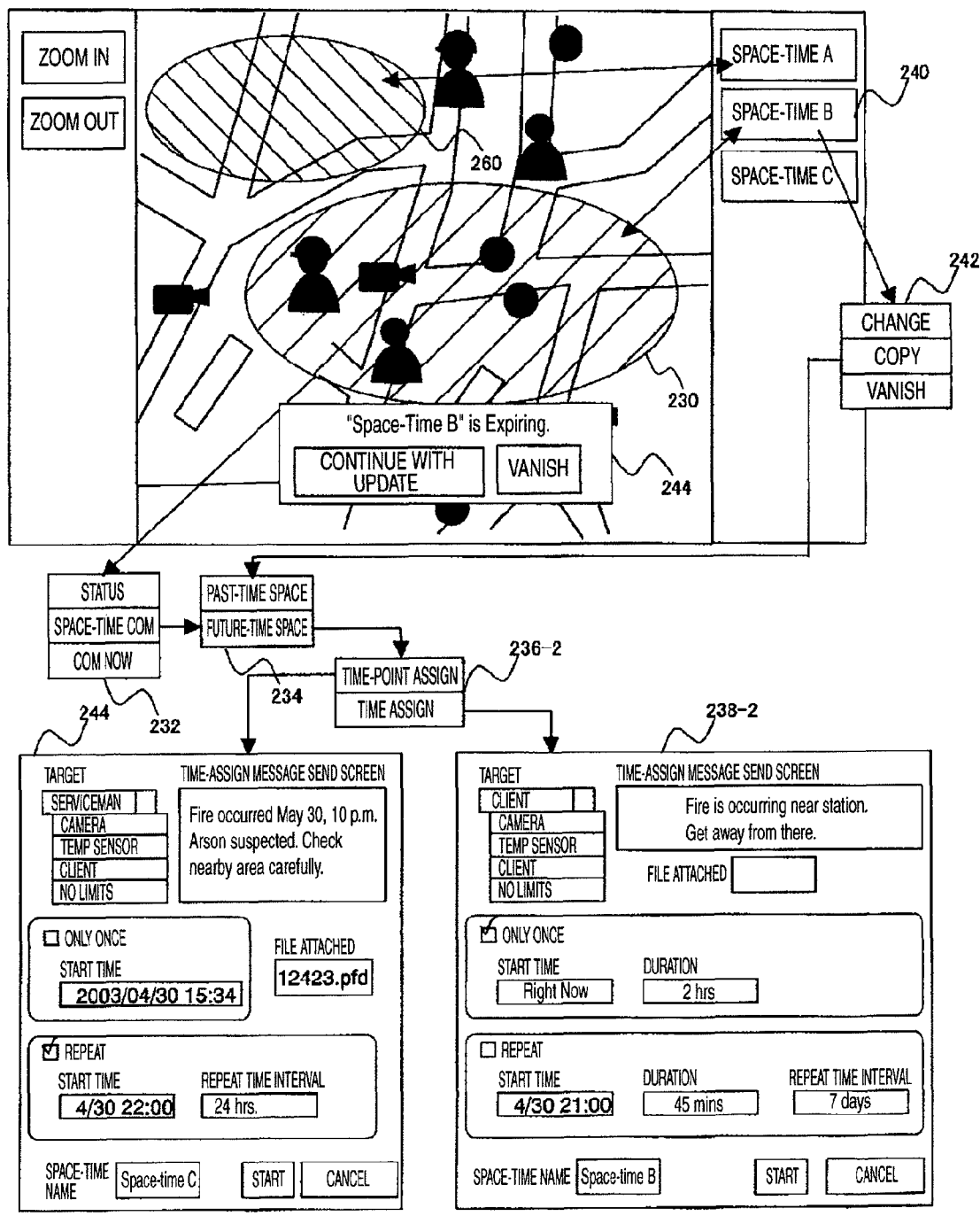
FIG. 15 is a diagram showing a flow of future-time space communication processing.
Figure 16:
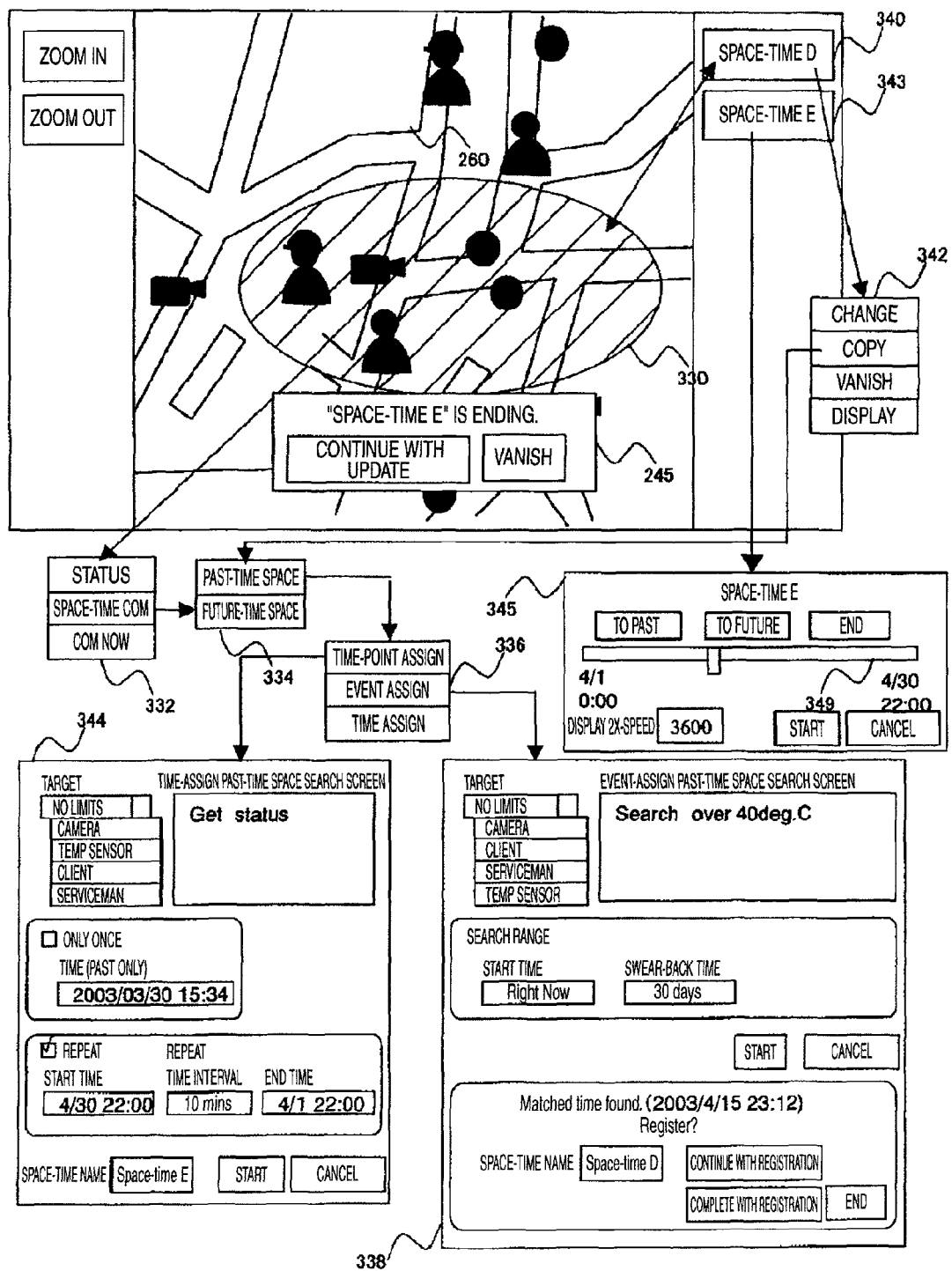
FIG. 16 is a diagram showing a flow of past-time space communication processing.
Figure 17:
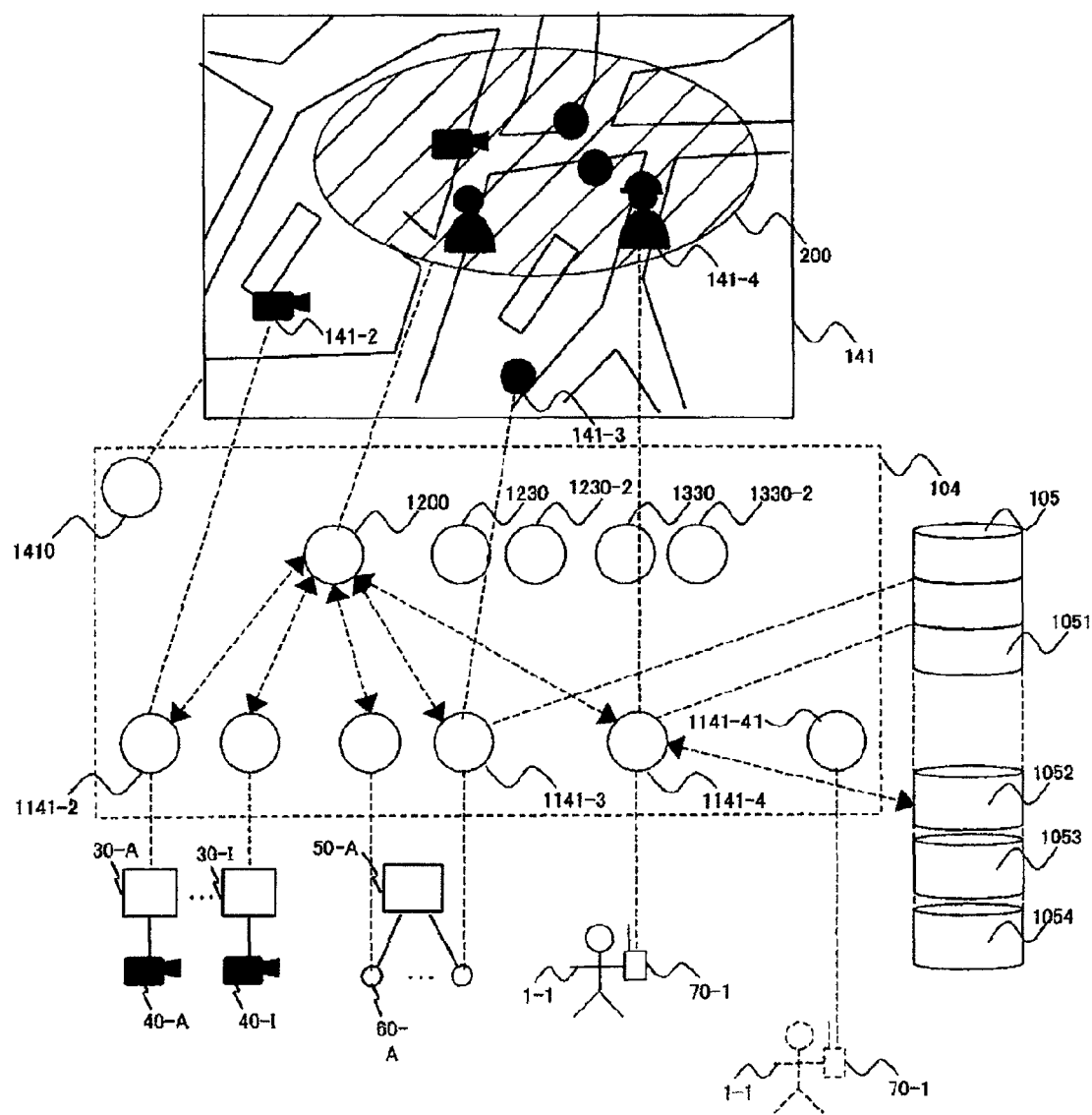
FIG. 17 is a diagram showing objects under management, space-time objects and others.
Figure 18:
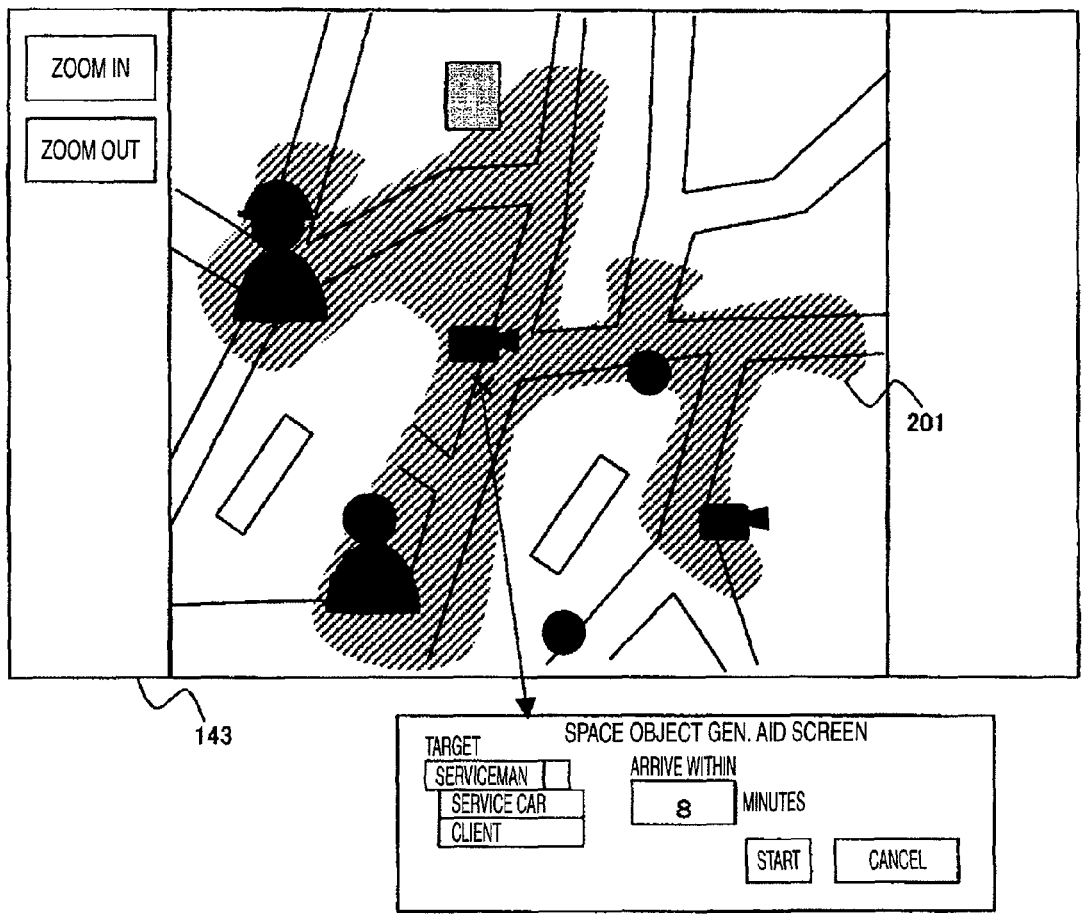
FIG. 18 is a diagram showing a space object 201.
Figure 19:
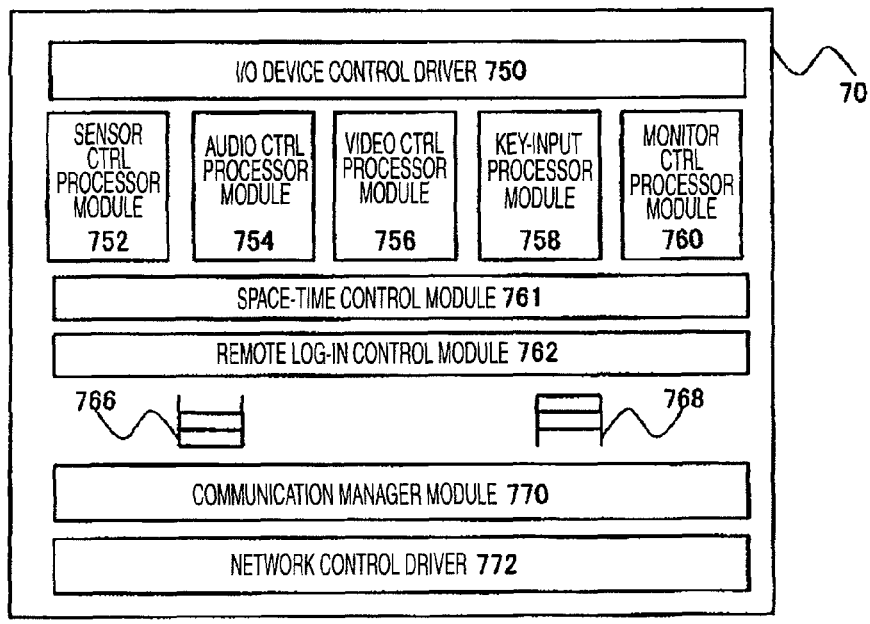
FIG. 19 is a diagram showing a software configuration of a camera control device 30 in an embodiment 2.
Figure 20:
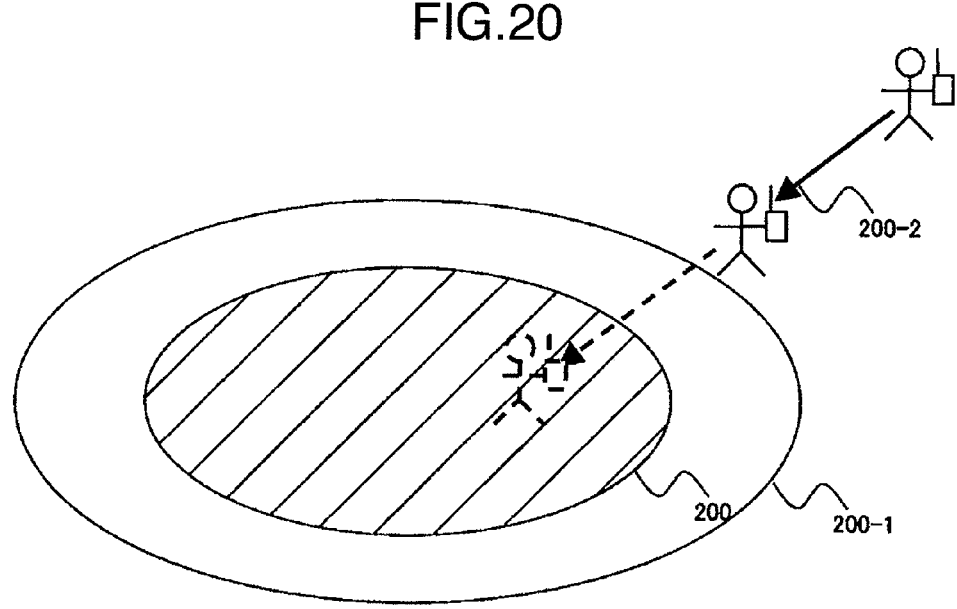
FIG. 20 depicts the criterion of judgment in an event for sending immediate space object information.
Figure 21:
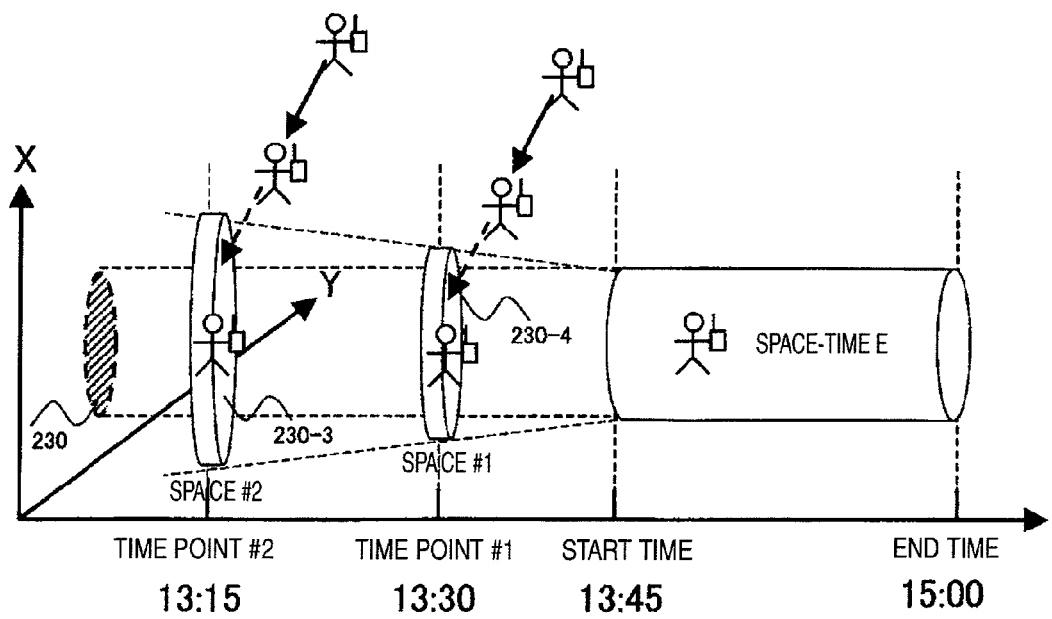
FIG. 21 depicts the judgment criterion in a future-time space object sending event.
Figure 22:
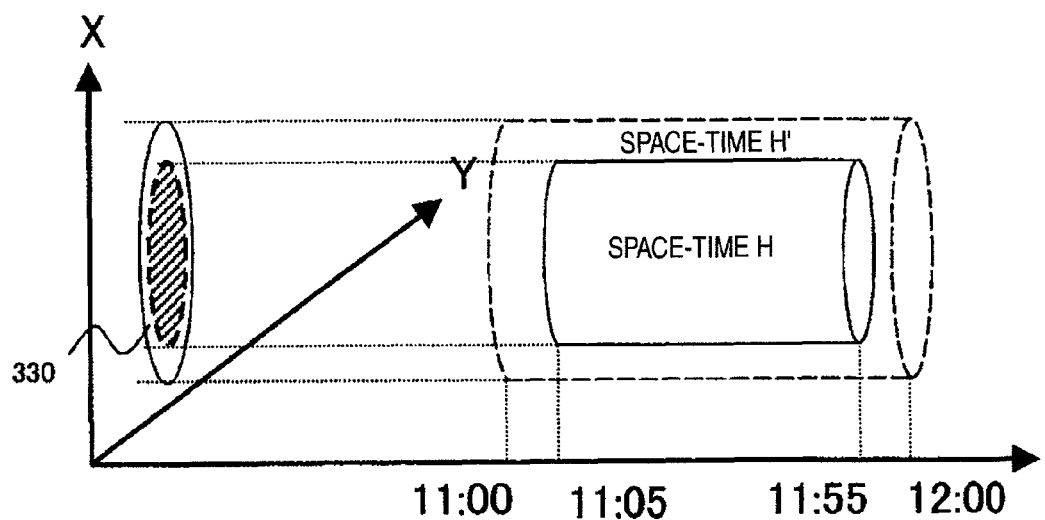
FIG. 22 depicts the judgment criterion in a past-time space object information sending event.
Figure 23:
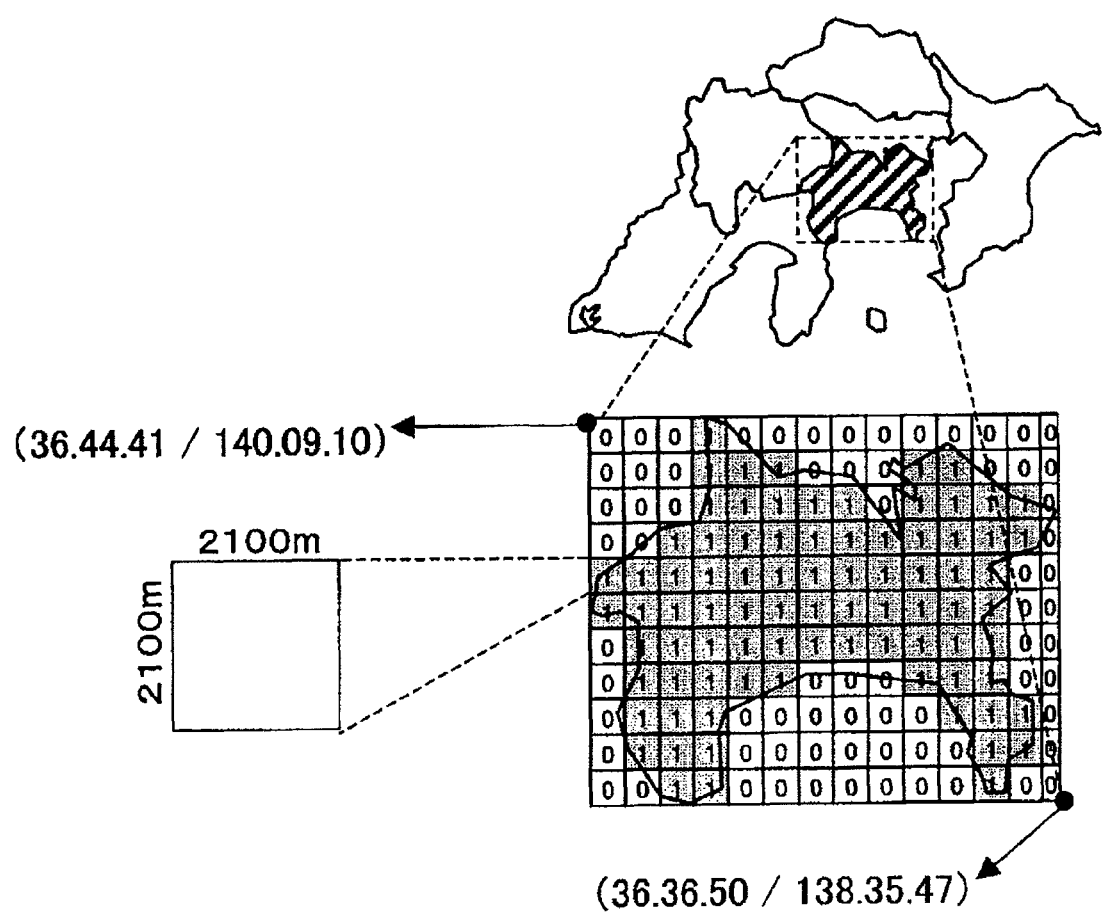
FIG. 23 is a diagram showing a space which belongs to Kanagawa prefecture in Japan in an embodiment 3.
Figure 24:
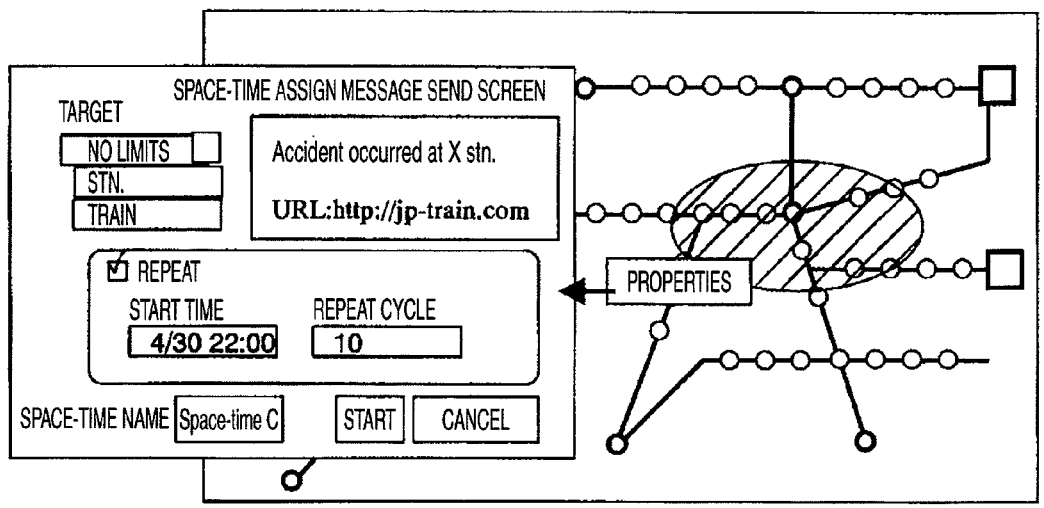
FIG. 24 is a diagram showing a case example with the invention being applied to a railway/traffic service in accordance with an embodiment 4.
Figure 25:
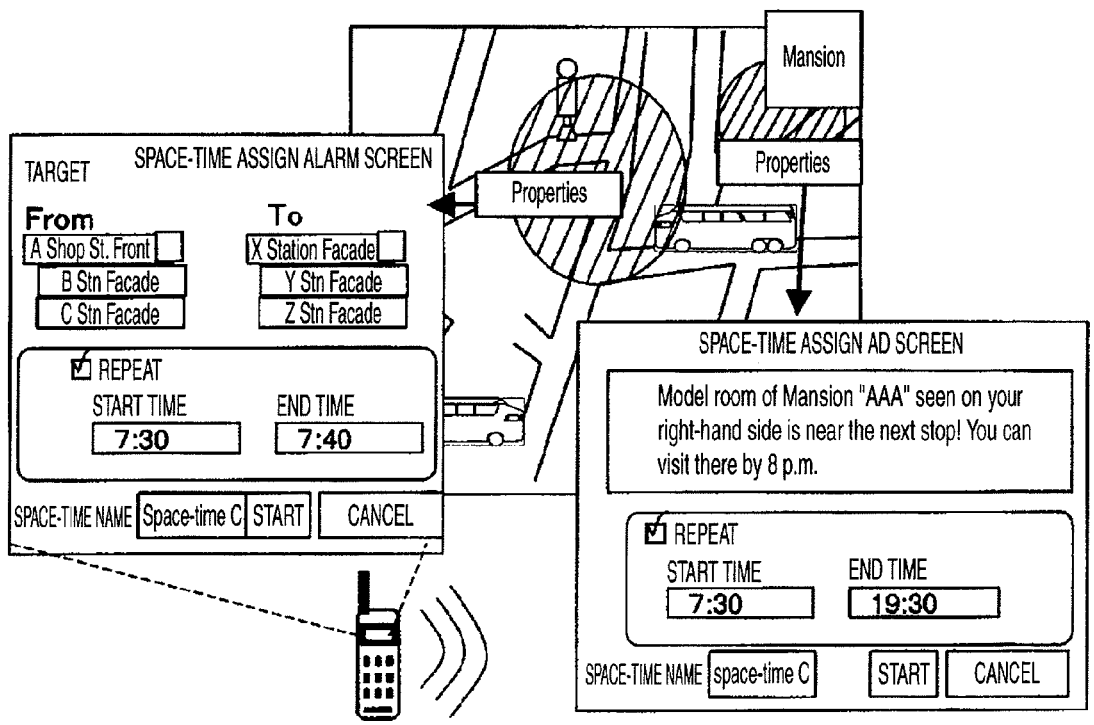
FIG. 25 is a diagram showing a case example with the invention applied to the railway/traffic service in the embodiment 4.
Figure 26:
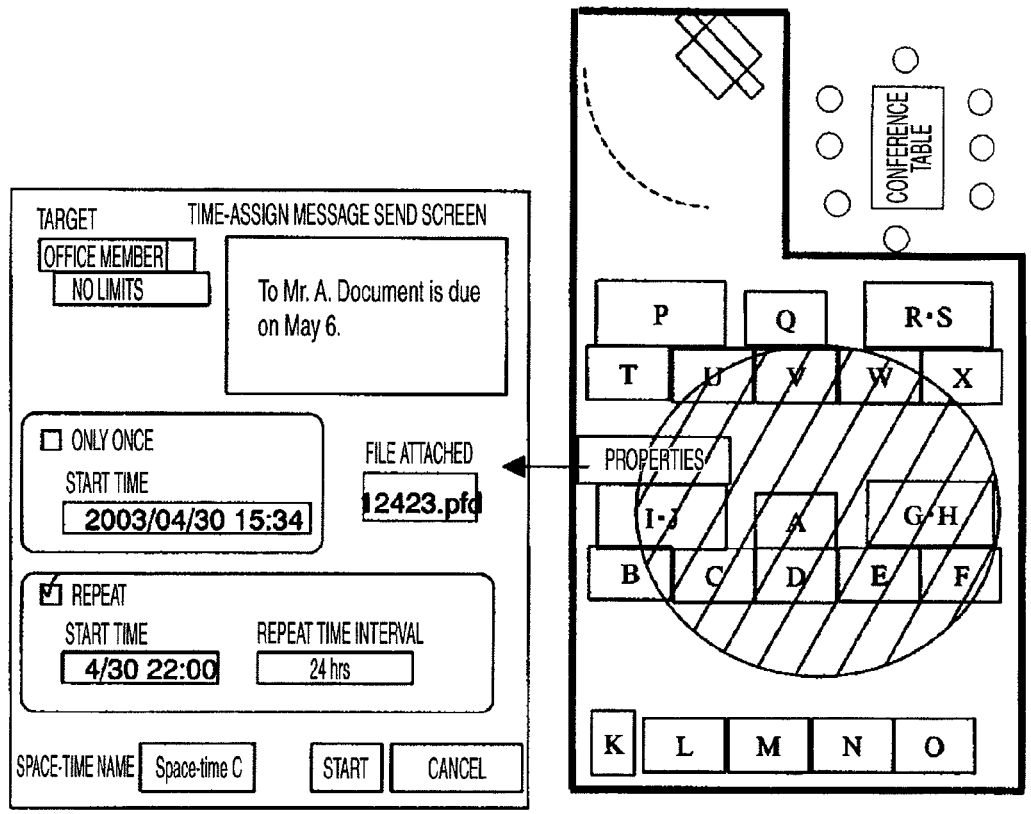
FIG. 26 is a diagram showing a case example with the invention applied to an office environment in an embodiment 5.
Figure 27:
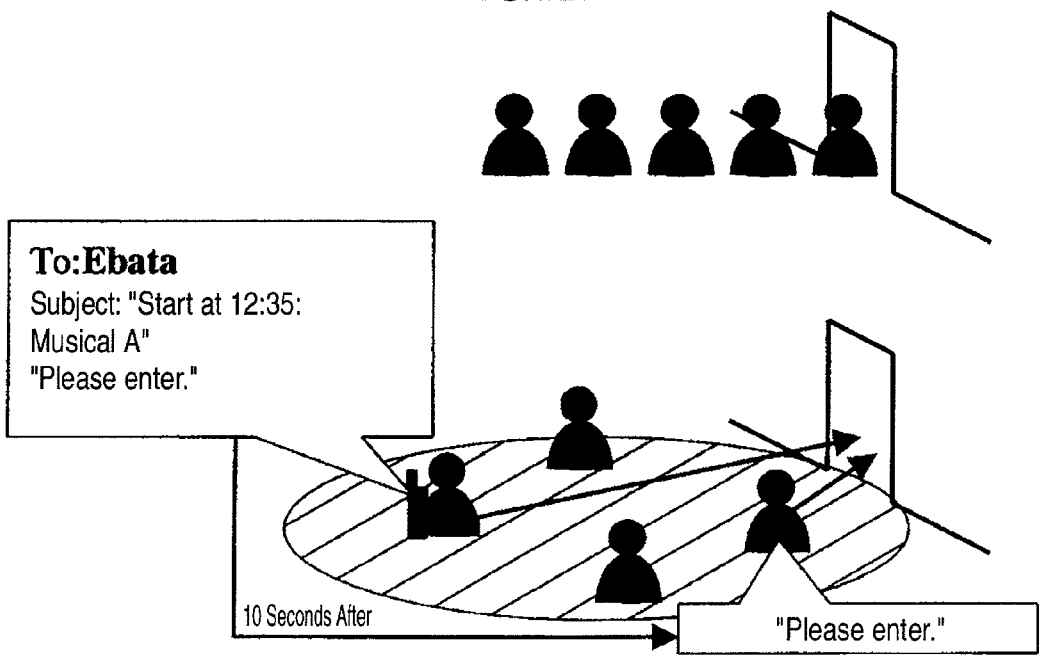
FIG. 27 is a diagram showing a case example with the invention applied to a queue of amusement in an embodiment 6.

The invention claimed is:

1. A space-time communication system including a control device operative to send a message toward at least one of target subjects existing within a geographical space, wherein said control device is configured to perform:
   receiving a designation of a space, a future time point and a message;
   specifying in advance of the future time point a target subject which is estimated to exist in the received designated space at the received designated future time;
   sending information of said received designated space and said received designated future time point to said subject in advance of the future time point;
   receiving information from said subject when said subject exists in said received designated space after said received designated future time is reached; and
   upon receiving said information, sending said received designated message to the subject.

2. The space-time communication system according to claim 1, wherein the time space specified by said received designated space and future time is defined as a future-time space; and said future-time space is arranged by limiting said space by a time period of from a present time point to said future time point.

3. The space-time communication system according to claim 1, wherein the time space specified by said received designated space and future time is defined as a future-time space; and more than one future time is arranged from a start future time point to an end future time point, and wherein said future-time space is arranged by limiting said space by said more than one future time.

4. The space-time communication system according to claim 1, wherein the time space specified by said received designated space and future time is defined as a future-time space; and said future-time space is arranged by limiting said space by more than one of said future time point.

5. A space-time communication system including a control device operative to send a message toward at least one of target subjects existing within a geographical space, wherein said control device is configured to perform:
   receiving a designation of a space, a past time point and a message;
   specifying a target subject which is estimated to have existed in the received designated space at the received designated past time;
   sending information of said received designated space and said received designated past time to said subject;
   receiving information from said subject, said information indicating whether said subject existed in said received designated space after said received designated past time had been reached; and
   sending said received designated message to the subject specified if said subject existed in said received designated space after said received designated past time.

6. The space-time communication system according to claim 5, wherein said past-time space is arranged by limiting said space by a time period of from the past time to a present time point.

7. The space-time communication system according to claim 5, wherein more than one past time is arranged from a start past time point to an end past time point, and wherein said past-time space is arranged by limiting said space by said more than one past time.

8. The space-time communication system according to claim 5, wherein said past-time space is arranged by limiting said space by one or more than one of said past time point.

9. A space-time communication method for operating a system including a control device operative to send a message toward at least one of target subjects existing within a geographical space, wherein said method comprises:
- receiving a designation of a space, a future time point and a message;
- specifying in advance of the future time point a target subject which is estimated to exist in the received designated space at the received designated future time; and
- sending information of said received designated space and said received designated future time point to said subject in advance of the future time point;
- receiving information from said subject when said subject exists in said received designated space after said received designated future time is reached; and
- upon receiving said information, sending said received designated message to the subject.

10. A space-time communication method for operating a system including a control device operative to send a message toward at least one of target subjects existing within a geographical space, wherein said method comprises:
- receiving a designation of a space, a past time point and a message;
- specifying a target subject which is estimated to have existed in the received designated space at the received designated past time;
- sending information of said received designated space and said received designated past time to said subject;
- receiving information from said subject, said information indicating whether said subject existed in said received designated space after said received designated past time had been reached; and
- sending said received designated message to the subject specified if said subject existed in said received designated space after said received designated past time.

* * * * *